United States Patent
Shibata et al.

(10) Patent No.: US 11,139,505 B2
(45) Date of Patent: Oct. 5, 2021

(54) METHOD FOR PRODUCING SOLID ELECTROLYTE, AND ELECTROLYTE PRECURSOR

(71) Applicant: IDEMITSU KOSAN CO., LTD., Chiyoda-ku (JP)

(72) Inventors: Masayuki Shibata, Chiba (JP); Hiroaki Yamada, Chiba (JP); Nobuhito Nakaya, Ichihara (JP); Yusuke Iseki, Chiba (JP); Minoru Senga, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 17/254,543

(22) PCT Filed: Nov. 22, 2019

(86) PCT No.: PCT/JP2019/045852
§ 371 (c)(1),
(2) Date: Dec. 21, 2020

(87) PCT Pub. No.: WO2020/105737
PCT Pub. Date: May 28, 2020

(65) Prior Publication Data
US 2021/0249685 A1    Aug. 12, 2021

(30) Foreign Application Priority Data

Nov. 22, 2018 (JP) .............................. JP2018-219130
Aug. 9, 2019 (JP) .............................. JP2019-148210

(51) Int. Cl.
*H01M 10/0562* (2010.01)

(52) U.S. Cl.
CPC .. *H01M 10/0562* (2013.01); *H01M 2300/008* (2013.01)

(58) Field of Classification Search
None
See application file for complete search history.

(56) References Cited

U.S. PATENT DOCUMENTS

2014/0004257 A1* 1/2014 Kubo .................... H01M 4/621
427/126.1

FOREIGN PATENT DOCUMENTS

| JP | 2005-100966 A | 4/2005 |
|----|----|----|
| JP | 2009-143975 A | 7/2009 |

(Continued)

OTHER PUBLICATIONS

Xu et al., "Liquid-involved synthesis and processing of sulfide-based solid electroltyes, electrodes, and all-solid-state batteries," Materials Today Nano 8 (2019) 100048, available online Jul. 11, 2019 (Year: 2019).*

(Continued)

*Primary Examiner* — Amanda J Barrow
(74) *Attorney, Agent, or Firm* — Oblon, McClelland, Maier & Neustadt, L.L.P.

(57) ABSTRACT

A method of producing a solid electrolyte having a high ionic conductivity, which adopts a liquid-phase method and suppresses the generation of hydrogen sulfide, wherein a raw material inclusion containing a lithium element, a sulfur element, a phosphorus element, and a halogen element is mixed with a complexing agent containing a compound having at least two tertiary amino groups; and an electrolyte precursor constituted of a lithium element, a sulfur element, a phosphorus element, a halogen element, and a complexing agent containing a compound having at least two tertiary amino groups.

15 Claims, 6 Drawing Sheets

(Embodiment A)

(Embodiment B)

(56) References Cited

FOREIGN PATENT DOCUMENTS

| JP | 2014-191899 A | 10/2014 | |
|---|---|---|---|
| JP | 2014-212065 | * 11/2014 | ........ H01M 10/0562 |
| JP | 2014-212065 A | 11/2014 | |
| WO | WO 2014/192309 A1 | 12/2014 | |
| WO | WO 2017/159667 A1 | 9/2017 | |
| WO | WO 2018/054709 A1 | 3/2018 | |
| WO | WO 2018/193994 A1 | 10/2018 | |

OTHER PUBLICATIONS

International Search Report dated Feb. 10, 2020 in PCT/JP2019/045852 filed on Nov. 22, 2019, 2 pages.
Sedlmaier et al., "$Li_4PS_4I$: A $Li^+$ Superionic Conductor Synthesized by a Solvent-Based Soft Chemistry Approach", Chemistry of Materials, 2017, vol. 29, pp. 1830-1835.

* cited by examiner (Embodiment A)  (Embodiment B)

(Embodiment C)  (Embodiment D)

METHOD FOR PRODUCING SOLID ELECTROLYTE, AND ELECTROLYTE PRECURSOR

TECHNICAL FIELD

The present invention relates to a method for producing a solid electrolyte and an electrolyte precursor.

BACKGROUND ART

With rapid spread of information-related instruments, communication instruments, and so on, such as personal computers, video cameras, and mobile phones, in recent years, development of batteries that are utilized as a power source therefor is considered to be important. Heretofore, in batteries to be used for such an application, an electrolytic solution containing a flammable organic solvent has been used. However, development of batteries having a solid electrolyte layer in place of an electrolytic solution is being made in view of the fact that by making the battery fully solid, simplification of a safety unit may be realized without using a flammable organic solvent within the battery, and the battery is excellent in manufacturing costs and productivity.

A production method of a solid electrolyte to be used for a solid electrolyte layer is roughly classified into a solid-phase method and a liquid-phase method. Furthermore, as for the liquid-phase method, there are a homogeneous method in which a solid electrolyte material is completely dissolved in a solvent; and a heterogeneous method in which a solid electrolyte material is not completely dissolved in a solvent but undergoes through a suspension of solid-liquid coexistence. For example, as the solid-phase method, a method in which raw materials, such as liquid sulfide and diphosphorus pentasulfide are subjected to mechanical milling treatment using an apparatus, such as a ball mill and a bead mill and optionally subjected to heat treatment, thereby producing an amorphous or crystalline solid electrolyte is known (see, for example, PTL 1). In accordance with this method, the solid electrolyte is obtained by applying a mechanical stress to the raw materials, such as lithium sulfide, to promote the reaction of the solids with each other.

On the other hand, as for the homogenous method regarding the liquid-phase method, a method in which a solid electrolyte is dissolved in a solvent and redeposited is known (see, for example, PTL 2). In addition, as for the heterogeneous method, a method in which solid electrolyte raw materials, such as lithium sulfide, are allowed to react in a solvent containing a polar aprotic solvent is known (see, for example, PTLs 3 and 4 and NPL 1). For example, PTL 4 discloses that a production method of a solid electrolyte having an $Li_4PS_4I$ structure includes a step in which dimethoxyethane (DME) is used and bound with the $Li_3PS_4$ structure, to obtain $Li_4PS_4$-DME. The obtained solid electrolyte has an ionic conductivity of $5.5 \times 10^{-5}$ S/cm ($3.9 \times 10^{-4}$ S/cm in the calcium-doped product). Toward practical use of an all-solid-state battery, the liquid-phase method is recently watched as a method in which it can be synthesized simply and in a large amount in addition to versatility and applicability.

CITATION LIST

Patent Literature

PTL 1: WO 2017/159667 A
PTL 2: JP 2014-191899 A
PTL 3: WO 2014/192309 A
PTL 4: WO 2018/054709 A

Non-Patent Literature

NPL 1: CHEMISTRY OF MATERIALS, 2017, No. 29, pp. 1830-1835

SUMMARY OF INVENTION

Technical Problem

However, as for the conventional solid-phase method accompanied with mechanical milling treatment or the like, the solid-phase reaction is the center, and the solid electrolyte is readily obtained in a high purity, and thus, a high ionic conductivity can be realized. On the other hand, as for the liquid-phase method, for the reasons that the solid electrolyte is dissolved, and thus, decomposition, breakage, or the like of a part of the solid electrolyte components is generated during deposition, it was difficult to realize a high ionic conductivity as compared with the solid-phase synthesis method.

For example, according to the homogenous method, the raw materials or the solid electrolyte is once completely dissolved, and thus, the components can be homogenously dispersed in the liquid. But, in the subsequent deposition step, the deposition proceeds according to an inherent solubility of each of the components, and thus, it is extremely difficult to perform the deposition while keeping the dispersed state of the components. As a result, each of the components is separated and deposited. In addition, according to the homogenous method, an affinity between the solvent and lithium becomes excessively strong, and therefore, even by drying after deposition, the solvent hardly comes out. For these matters, the homogenous method involves such a problem that the ionic conductivity of the solid electrolyte is largely lowered.

In addition, even in the heterogeneous method of solid-liquid coexistence, a part of the solid electrolyte is dissolved, and thus, separation takes place owing to elution of the specified component, so that it is difficult to obtain a desired solid electrolyte.

Furthermore, as for a sulfide-based solid electrolyte, for the reason that hydrolysis reaction proceeds owing to contact with water in air, such as moisture, or other reason, there is a case where hydrogen sulfide is generated. In consequence, it is an ideal that a production process of a solid electrolyte or a battery is performed in a low dew point environment with less moisture; however, it is difficult economically and physically to perform all of steps at a high dew point, and actually, it is required to handle the solid electrolyte at a high dew point (for example, (dew point) −60° C. to −20° C.) in a dry room level. However, a sulfide-based solid electrolyte which is able to be handled at such a high dew point and also has practical performance has not been found out yet.

In view of the aforementioned circumstances, the present invention has been made, and an object thereof is to provide a production method in which adopting a liquid-phase method, a solid electrolyte having a high ionic conductivity, in which the generation of hydrogen sulfide is suppressed in a predetermined high dew point environment, is obtained; and an electrolyte precursor.

Solution to Problem

In order to solve the aforementioned problem, the present inventor made extensive and intensive investigations. As a result, it has been found that the foregoing problem can be solved by the following inventions.

1. A production method of a solid electrolyte, including mixing a raw material inclusion containing a lithium element, a sulfur element, a phosphorus element, and a halogen element with a complexing agent containing a compound having at least two tertiary amino groups in the molecule.
2. An electrolyte precursor constituted of a lithium element, a sulfur element, a phosphorus element, a halogen element, and a complexing agent containing a compound having at least two tertiary amino groups in the molecule.

Advantageous Effects of Invention

In accordance with the present invention, a solid electrolyte having a high ionic conductivity, in which the generation of hydrogen sulfide is suppressed, and an electrolyte precursor by adopting a liquid-phase method can be obtained.

DESCRIPTION OF EMBODIMENTS

Embodiments of the present invention (hereinafter sometimes referred to as "present embodiment") are hereunder described. In this specification, numerical values of an upper limit and a lower limit according to numerical value ranges of "or more", "or less", and "XX to YY" are each a numerical value which can be arbitrarily combined, and numerical values of the section of Examples can also be used as numerical values of an upper limit and a lower limit, respectively.

[Production Method of Solid Electrolyte]

A production method of a solid electrolyte of the present embodiment includes mixing a raw material inclusion containing a lithium element, a sulfur element, a phosphorus element, and a halogen element with a complexing agent containing a compound having at least two tertiary amino groups in the molecule (in this specification, the foregoing complexing agent will be sometimes referred to simply as "complexing agent").

The "solid electrolyte" as referred to in this specification means an electrolyte of keeping the solid state at 25° C. in a nitrogen atmosphere. The solid electrolyte in the present embodiment is a solid electrolyte containing a lithium element, a sulfur element, a phosphorus element, and a halogen element and having an ionic conductivity to be caused owing to the lithium element.

In the "solid electrolyte", both of a crystalline solid electrolyte having a crystal structure and an amorphous solid electrolyte, which are obtained by the production method of the present embodiment, are included. The crystalline solid electrolyte as referred to in this specification is a material that is a solid electrolyte in which peaks derived from the solid electrolyte are observed in an X-ray diffraction pattern in the X-ray diffractometry, and the presence or absence of peaks derived from the raw materials of the solid electrolyte does not matter. That is, the crystalline solid electrolyte contains a crystal structure derived from the solid electrolyte, in which a part thereof may be a crystal structure derived from the solid electrolyte, or all of them may be a crystal structure derived from the solid electrolyte. The crystalline solid electrolyte may be one in which an amorphous solid electrolyte is contained in a part thereof so long as it has the X-ray diffraction pattern as mentioned above. In consequence, in the crystalline solid electrolyte, a so-called glass ceramics which is obtained by heating the amorphous solid electrolyte to a crystallization temperature or higher is contained.

The amorphous solid electrolyte as referred to in this specification is a halo pattern in which other peak than the peaks derived from the materials is not substantially observed in an X-ray diffraction pattern in the X-ray diffractometry, and it is meant that the presence or absence of peaks derived from the raw materials of the solid electrolyte does not matter.

Figure 1:
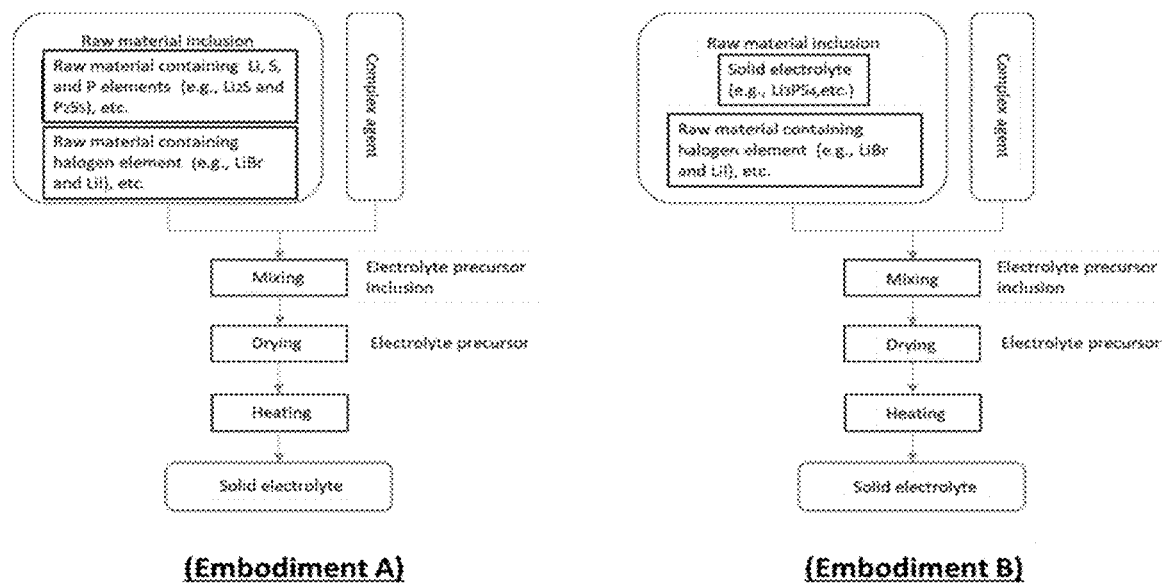
FIG. 1 is a flow chart of explaining one example of preferred modes of a production method of the present embodiment.

In the production method of a solid electrolyte of the present embodiment, there are included the following four embodiments depending upon whether or not a solid electrolyte, such as Li$_3$PS$_4$, is used as the raw material, and whether or not a solvent is used. Examples of preferred modes of these four embodiments are shown in FIG. 1 (Embodiments A and B) and FIG. 2 (Embodiments C and D). That is, in the present production method of a solid electrolyte of the present embodiment, there are preferably included a production method of using raw materials, such as lithium sulfide and diphosphorus pentasulfide, and a complexing agent (Embodiment A); a production method of containing, as raw materials, Li$_3$PS$_4$ that is an electrolyte main structure, and the like and using a complexing agent (Embodiment B); a production method of adding a solvent to the raw materials, such as lithium sulfide, and the complexing agent in the aforementioned Embodiment A (Embodiment C); and a production method of adding a solvent to the raw materials, such as Li$_3$PS$_4$, and the complexing agent in the aforementioned Embodiment B (Embodiment D).

The Embodiments A to D are hereunder described in order.

Embodiment A

As shown in FIG. 1, the Embodiment A is concerned with a mode in which in a production method of the present embodiment including mixing a raw material inclusion containing a lithium element, a sulfur element, a phosphorus element, and a halogen element with a complexing agent containing a compound having at least two tertiary amino groups in the molecule, lithium sulfide and diphosphorus pentasulfide, and the like are used as the raw material inclusion. By mixing the raw material inclusion with the complexing agent, in general, an electrolyte precursor inclusion that is a suspension is obtained, and by drying it, the electrolyte precursor is obtained. Furthermore, by heating the electrolyte precursor, the crystalline solid electrolyte is obtained. In addition, while not illustrated, it is preferred that the before heating, the electrolyte precursor is pulverized, and an electrolyte precursor pulverized product obtained through pulverization is heated. That is, the present production method preferably includes mixing; pulverization of the electrolyte precursor obtained through mixing; and heating of the electrolyte precursor pulverized product obtained through pulverization.

While the description is hereunder made beginning from Embodiment A, one described with the wordings "of the present embodiment" is a matter applicable even in other embodiments.

(Raw Material Inclusion)

The raw material inclusion which is used in the present embodiment is one containing a lithium element, a sulfur element, a phosphorus element, and a halogen element.

As the raw materials to be contained in the raw material inclusion, for example, a compound containing at least one of a lithium element, a sulfur element, a phosphorus element, and a halogen element can be used. More specifically, representative examples of the foregoing compound include raw materials composed of at least two elements selected from the aforementioned four elements, such as lithium sulfide; lithium halides, e.g., lithium fluoride, lithium chloride, lithium bromide, and lithium iodide; phosphorus sulfides, e.g., diphosphorus trisulfide ($P_2S_3$) and diphosphorus pentasulfide ($P_2S_5$); phosphorus halides, e.g., various phosphorus fluorides (e.g., $PF_3$ and $PF_5$), various phosphorus chlorides (e.g., $PCl_3$, $PCl_5$, and $P_2Cl_4$), various phosphorus bromides (e.g., $PBr_3$ and $PBr_5$), and various phosphorus iodides (e.g., $PF_3$ and $P_2I_4$); and thiophosphoryl halides, e.g., thiophosphoryl fluoride ($PSF_3$), thiophosphoryl chloride ($PSCl_3$), thiophosphoryl bromide ($PSBr_3$), thiophosphoryl iodide ($PSI_3$), thiophosphoryl dichlorofluoride ($PSCl_2F$), and thiophosphoryl dibromofluoride ($PSBr_2F$), as well as halogen simple substances, such as fluorine ($F_2$), chlorine ($Cl_2$), bromine ($Br_2$), and iodine ($I_2$), with bromine ($Br_2$) and iodine ($I_2$) being preferred.

As materials which may be used as the raw material other than those mentioned above, a compound containing not only at least one element selected from the aforementioned four elements but also other element than the foregoing four elements can be used. More specifically, examples thereof include lithium compounds, such as lithium oxide, lithium hydroxide, and lithium carbonate; alkali metal sulfides, such as sodium sulfide, potassium sulfide, rubidium sulfide, and cesium sulfide; metal sulfides, such as silicon sulfide, germanium sulfide, boron sulfide, gallium sulfide, tin sulfide (e.g., SnS and $SnS_2$), aluminum sulfide, and zinc sulfide; phosphoric acid compounds, such as sodium phosphate and lithium phosphate; halide compounds of an alkali metal other than lithium, such as sodium halides, e.g., sodium iodide, sodium fluoride, sodium chloride, and sodium bromide; metal halides, such as an aluminum halide, a silicon halide, a germanium halide, an arsenic halide, a selenium halide, a tin halogen, an antimony halide, a tellurium halide, and a bismuth halide; and phosphorus oxyhalides, such as phosphorus oxychloride ($POCl_3$) and phosphorus oxybromide ($POBr_3$).

In the Embodiment A, among them, phosphorus sulfides, such as lithium sulfide, diphosphorus trifluoride ($P_2S_3$), and diphosphorus pentasulfide ($P_2S_5$); halogen simple substances, such as fluorine ($F_2$), chlorine ($Cl_2$), bromine ($Br_2$), and iodine ($I_2$); and lithium halides, such as lithium fluoride, lithium chloride, lithium bromide, and lithium iodide are preferred as the raw material from the viewpoint of more easily obtaining a solid electrolyte having a high ionic conductivity. Preferred examples of a combination of raw materials include a combination of lithium sulfide, diphosphorus pentasulfide, and a lithium halide; and a combination of lithium sulfide, phosphorus pentasulfide, and a halogen simple substance, in which the lithium halide is preferably lithium bromide or lithium iodide, and the halogen simple substance is preferably bromine or iodine.

The lithium sulfide which is used in the Embodiment A is preferably a particle.

An average particle diameter ($D_{50}$) of the lithium sulfide particle is preferably 10 μm or more and 2,000 μm or less, more preferably 30 μm or more and 1,500 μm or less, and still more preferably 50 μm or more and 1,000 μm or less. In this specification, the average particle diameter ($D_{50}$) is a particle diameter to reach 50% of all the particles in sequential cumulation from the smallest particles in drawing the particle diameter distribution cumulative curve, and the volume distribution is concerned with an average particle diameter which can be, for example, measured with a laser diffraction/scattering particle diameter distribution measuring device. In addition, among the above-exemplified raw materials, the solid raw material is preferably one having an average particle diameter of the same degree as in the aforementioned lithium sulfide particle, namely one having an average particle diameter falling within the same range as in the aforementioned lithium sulfide particle is preferred.

In the case of using lithium sulfide, diphosphorus pentasulfide, and the lithium halide as the raw materials, from the viewpoint of obtaining higher chemical stability and a higher ionic conductivity, a proportion of lithium sulfide relative to the total of lithium sulfide and diphosphorus pentasulfide is preferably 70 to 80 mol %, more preferably 72 to 78 mol %, and still more preferably 74 to 76 mol %.

In the case of using lithium sulfide, diphosphorus pentasulfide, a lithium halide, and other raw material to be optionally used, the content of lithium sulfide and diphosphorus pentasulfide relative to the total of the aforementioned raw materials is preferably 60 to 100 mol %, more preferably 65 to 90 mol %, and still more preferably 70 to 80 mol %.

In the case of using a combination of lithium bromide and lithium iodide as the lithium halide, from the viewpoint of enhancing the ionic conductivity, a proportion of lithium bromide relative to the total of lithium bromide and lithium iodide is preferably 1 to 99 mol %, more preferably 20 to 90 mol %, still more preferably 40 to 80 mol %, and especially preferably 50 to 70 mol %.

In the case of using not only a halogen simple substance but also lithium sulfide and diphosphorus pentasulfide as the raw materials, a proportion of the molar number of lithium sulfide excluding lithium sulfide having the same molar number as the molar number of the halogen simple substance relative to the total molar number of lithium sulfide and diphosphorus pentasulfide excluding lithium sulfide having the same molar number as the molar number of the halogen simple substance falls preferably within a range of 60 to 90%, more preferably within a range of 65 to 85%, still more preferably within a range of 68 to 82%, yet still more preferably within a range of 72 to 78%, and even yet still more preferably within a range of 73 to 77%. This is because when the foregoing proportion falls within the aforementioned ranges, a higher ionic conductivity is obtained. In addition, in the case of using lithium sulfide, diphosphorus pentasulfide, and a halogen simple substance, from the same viewpoint, the content of the halogen simple substance relative to the total amount of lithium sulfide, diphosphorus pentasulfide, and the halogen simple substance is preferably 1 to 50 mol %, more preferably 2 to 40 mol %, still more preferably 3 to 25 mol %, and yet still more preferably 3 to 15 mol %.

In the case of using lithium sulfide, diphosphorus pentasulfide, a halogen simple substance, and a lithium halide, the content (a mol %) of the halogen simple substance and the content (ß mol %) of the lithium halide relative to the total of the aforementioned raw materials preferably satisfy the following expression (2), more preferably satisfy the following expression (3), still more preferably satisfy the following expression (4), and yet still more preferably satisfy the following expression (5).

$$2 \leq (2\alpha+\beta) \leq 100 \quad (2)$$

$$4 \leq (2\alpha+\beta) \leq 80 \quad (3)$$

$$6 \leq (2\alpha+\beta) \leq 50 \quad (4)$$

$$6 \leq (2\alpha+\beta) \leq 30 \quad (5)$$

In the case of using two halogen simple substances, when the molar number in the substance of the halogen element of one side is designated as A1, and the molar number in the substance of the halogen element of the other side is designated as A2, an A1/A2 ratio is preferably (1 to 99)/(99 to 1), more preferably 10/90 to 90/10, still more preferably 20/80 to 80/20, and yet still more preferably 30/70 to 70/30.

In the case where the two halogen simple substances are bromine and iodine, when the molar number of bromine is designated as B1, and the molar number of iodine is designated as B2, a B1/B2 ratio is preferably (1 to 99)/(99 to 1), more preferably 15/85 to 90/10, still more preferably 20/80 to 80/20, yet still more preferably 30/70 to 75/25, and especially preferably 35/65 to 75/25.

(Complexing Agent)

In the production method of a solid electrolyte of the present embodiment, a complexing agent is used. The complexing agent as referred to in this specification is a substance capable of forming a complex together with the lithium element and means one having such properties of acting with the lithium element-containing sulfide and the halide, and the like contained in the aforementioned raw materials, thereby promoting formation of the electrolyte precursor, and in the present embodiment, one containing a compound having at least two tertiary amino groups in the molecule (in this specification, the foregoing compound will be sometimes referred to simply as "amine compound") is adopted.

As the complexing agent, any material can be used without being particularly restricted so long as it has the aforementioned properties and contains a compound having at least two tertiary amino groups in the molecule. In particular, the foregoing compound is one having two tertiary amino group containing a nitrogen element, among elements having a high affinity with the lithium element, for example, a hetero element, such as a nitrogen element, an oxygen element, and a chlorine element. This is because the amino group containing a nitrogen element that is a hetero element may be coordinated (bound) with lithium, especially the tertiary amino group is readily coordinated (bound) with lithium.

Since the complexing agent contains the compound having at least two tertiary amino groups in the molecule, it may be considered that the nitrogen element that is a hetero element in the molecule has a high affinity with the lithium element, and the complexing agent has such properties of binding with the lithium-containing structure which is existent as a main structure in the solid electrolyte obtained by the present production method, such as $Li_3PS_4$ containing representatively a $PS_4$ structure, and the lithium-containing raw materials, such as a lithium halide, thereby easily forming an aggregate. For that reason, since by mixing the aforementioned raw material inclusion and the complexing agent, an aggregate via the lithium-containing structure, such as a $PS_4$ structure, or the complexing agent, and an aggregate via the lithium-containing raw material, such as a lithium halide, or the complexing agent are evenly existent, whereby an electrolyte precursor in which the halogen element is more likely dispersed and fixed is obtained, as a result, it may be considered that a solid electrolyte having a high ionic conductivity, in which the generation of hydrogen sulfide is suppressed, is obtained.

In view of the fact that the compound having at least two tertiary amino groups in the molecule, which is contained in the complexing agent to be used in the present embodiment, has at least two hetero elements in the molecule as the tertiary amino groups, the lithium-containing structure, such as $Li_3PS_4$ containing a $PS_4$ structure, and the lithium-containing raw material, such as a lithium halide, can be bound with each other via the at least two hetero elements in the molecule, the halogen element is more likely dispersed and fixed in the electrolyte precursor. As a result, a solid electrolyte having a high ionic conductivity, in which the generation of hydrogen sulfide is suppressed, is obtained.

The amine compound which is contained in the complexing agent is one having at least two tertiary amino groups in the molecule, and in view of the fact that the complexing agent has such a structure, the lithium-containing structure, such as $Li_3PS_4$ containing a $PS_4$ structure, and the lithium-containing raw material, such as a lithium halide, can be bound with each other via at least two nitrogen elements in the molecule, the halogen element is more likely dispersed and fixed in the electrolyte precursor. As a result, a solid electrolyte having a high ionic conductivity is obtained.

Examples of such an amine compound include amine compounds, such as aliphatic amines, alicyclic amines, heterocyclic amines, and aromatic amines, and these amine compounds can be used alone or in combination of plural kinds thereof. Above all, aliphatic amines are preferred from the viewpoint that the functions of the complexing agent are readily revealed.

More specifically, as the aliphatic amine, aliphatic tertiary diamines, such as N,N,N'N-tetramethyldiaminomethane, N,N,N'N-tetramethylethylenediamine, N,N,N',N'-tetraethylethylenediamine, N,N,N',N'-tetramethyldiaminopropane, N,N,N',N'-tetraethyldiaminopropane, N,N,N',N'-tetramethyldiaminobutane, N,N,N',N'-tetramethyldiaminopentane, and N,N,N',N'-tetramethyldiaminohexane, are representatively preferably exemplified. Here, in the exemplification in this specification, for example, when the diaminobutane is concerned, it should be construed that all of isomers inclusive of not only isomers regarding the position of the amino group, such as 1,2-bis(dimethylamino)butane, 1,3-bis(dimethylamino)butane, and 1,4-bis(dimethylamino)butane, but also linear or branched isomers and so on regarding the butane are included unless otherwise noted.

The carbon number of the aliphatic amine is preferably 2 or more, more preferably 4 or more, and still more preferably 6 or more, and an upper limit thereof is preferably 10 or less, more preferably 8 or less, and still more preferably 7 or less. In addition, the carbon number of the hydrocarbon group of the aliphatic hydrocarbon group in the aliphatic tertiary amine is preferably 2 or more, and an upper limit thereof is preferably 6 or less, more preferably 4 or less, and still more preferably 3 or less.

As the alicyclic amine, alicyclic tertiary diamines, such as N,N,N',N'-tetramethyl-cyclohexanediamine and bis(ethylmethylamino)cyclohexane, are representatively preferably exemplified. As the heterocyclic diamine, heterocyclic tertiary diamines, such as N,N-dimethylpiperazine and bismethylpiperidylpropane, are representatively preferably exemplified.

The carbon number of each of the alicyclic amine and the heterocyclic amine is preferably 3 or more, and more preferably 4 or more, and an upper limit thereof is preferably 16 or less, and more preferably 14 or less.

As the aromatic amine, aromatic tertiary diamines, such as N,N-dimethylphenylenediamine, N,N,N',N'-tetramethylphenylenediamine, N,N,N',N'-tetramethyldiaminodiphenylmethane, and N,N,N',N'-tetramethylnaphthalenediamine, are representatively preferably exemplified.

The carbon number of the aromatic amine is preferably 6 or more, more preferably 7 or more, and still more preferably 8 or more, and an upper limit thereof is preferably 16 or less, more preferably 14 or less, and still more preferably 12 or less.

The amine compound which is used in the present embodiment may also be one substituted with a substituent, such as an alkyl group, an alkenyl group, an alkoxy group, a hydroxy group, and a cyano group, or a halogen atom.

While the diamines have been exemplified as specific examples, needless to say, the amine compound which may be used in the present embodiment is not limited to the diamines so long as it has at least two tertiary amino groups in the molecule, and for example, polyamines having three or more amino groups, such as N,N,N',N'',N''-pentamethyldiethylenetriamine, N,N'-bis [(dimethylamino)ethyl]-N,N'-dimethylethylenediamine, and hexamethylenetetramine, can also be used.

Among those described above, from the viewpoint of obtaining a higher ionic conductivity, tertiary diamines having two tertiary amino groups are more preferred, tertiary diamines having two tertiary amino groups on the both ends are still more preferred, and aliphatic tertiary diamines having a tertiary amino group on the both ends are yet still more preferred. In the aforementioned amine compounds, as the aliphatic tertiary diamine having a tertiary amino group on the both ends, tetramethylethylenediamine, tetraethylethylenediamine, tetramethyldiaminopropane, and tetraethyldiaminopropane are preferred, and taking into account easiness of availability and so on, tetramethylethylenediamine and tetramethyldiaminopropane are preferred.

Besides the aforementioned amine compound, other complexing agent may be added and used. As other complexing agent than the amine compound, for example, a compound having a group containing a hetero element, such as a halogen element, e.g., an oxygen element and a chlorine element, is high in an affinity with the lithium element, and such a compound is exemplified as the other complexing agent than the amine compound. In addition, a compound having a group containing, as the hetero element, a nitrogen element other than the amino group, for example, a nitro group and an amide group, provides the same effects. In the present embodiment, it is preferred that the content of the amine compound in the complexing agent is high as far as possible. Specifically, the foregoing content is 60% by mass or more, more preferably 80% by mass or more, still more preferably 90% by mass or more, yet still more preferably 95% by mass or more, and especially preferably 100% by mass. That is, it is especially preferred that the whole of the complexing agent is the amine compound.

Examples of the other complexing agent include polyamines having three or more amino groups, such as diethylenetriamine, N,N',N''-trimethyldiethylenetriamine, triethylenetetramine, and tetraethylenepentamine; diamines, such as aliphatic primary diamines, e.g., ethylenediamine, diaminopropane, and diaminobutane; aliphatic secondary diamines, e.g., N,N'-dimethylethylenediamine, N,N'-diethylethylenediamine, N,N'-dimethyldiaminopropane, and N,N'-diethyldiaminopropane; alicyclic primary diamines, e.g., cyclopropanediamine and cyclohexanediamine; alicyclic secondary diamines, e.g., bisaminomethylcyclohexane; heterocyclic primary diamines, e.g., isophoronediamine; and heterocyclic secondary diamines, e.g., piperazine and dipiperidylpropane; monoamines, such as trimethylamine, triethylamine, ethyldimethylamine, aliphatic monoamines corresponding to various diamines, such as the aforementioned aliphatic diamines, piperidine compounds, such as piperidine, methylpiperidine, and tetramethylpiperidine, pyridine compounds, such as pyridine and picoline, morpholine compounds, such as morpholine, methylmorpholine, and thiomorpholine, imidazole compounds, such as imidazole and methylimidazole, alicyclic monoamines, such as monoamines corresponding to the aforementioned alicyclic diamines, heterocyclic monoamines, such as monoamines corresponding to the aforementioned heterocyclic diamines, and aromatic monoamines, such as aromatic monoamines corresponding to the aforementioned aromatic diamines; alcohol-based solvents, such as ethanol and butanol; ester-based solvents, such as ethyl acetate and butyl acetate; aldehyde-based solvents, such as formaldehyde, acetaldehyde, and dimethylformamide; ketone-based solvents, such as acetone and methyl ethyl ketone; ether-based solvents, such as diethyl ether, diisopropyl ether, dibutyl ether, tetrahydrofuran, dimethoxyethane, cyclopentyl methyl ether, tert-butyl methyl ether, and anisole; halogen element-containing aromatic hydrocarbon solvents, such as trifluoromethylbenzene, nitrobenzene, chlorobenzene, chlorotoluene, and bromobenzene; and solvents containing a carbon atom and a hetero atom, such as acetonitrile, dimethyl sulfoxide, and carbon disulfide. Of these, ether-based solvents are preferred; diethyl ether, diisopropyl ether, dibutyl ether, and tetrahydrofuran are more preferred; and diethyl ether, diisopropyl ether, and dibutyl ether are still more preferred.

(Mixing)

As shown in the flow chart of FIG. 1, the raw material inclusion and the complexing agent are mixed. In the present embodiment, though a mode of mixing the raw material inclusion and the complexing agent may be in any of a solid state and a liquid state, in general, the raw material inclusion contains a solid, whereas the complexing agent is in a liquid state, and therefore, in general, mixing is made in a mode in which the solid raw material inclusion is existent in the liquid complexing agent.

The content of the raw material inclusion is preferably 5 g or more, more preferably 10 g or more, still more preferably 30 g or more, and yet still more preferably 50 g or more relative to the amount of one liter of the complexing agent, and an upper limit thereof is preferably 500 g or less, more preferably 400 g or less, still more preferably 300 g or less, and yet still more preferably 250 g of less. When the content of the raw material inclusion falls within the aforementioned range, the raw material inclusion is readily mixed, the dispersing state of the raw materials is enhanced, and the reaction among the raw materials is promoted, and therefore, the electrolyte precursor and further the solid electrolyte are readily efficiently obtained.

A method for mixing the raw material inclusion and the complexing agent is not particularly restricted, and the raw materials contained in the raw material inclusion and the complexing agent may be charged in an apparatus capable of mixing the raw material inclusion and the complexing agent and mixed. For example, by feeding the complexing agent into a tank, actuating an impeller, and then gradually adding the raw materials, a favorable mixing state of the raw material inclusion is obtained, and dispersibility of the raw materials is enhanced, and thus, such is preferred.

In the case of using a halogen simple substance as the raw material, there is a case where the raw material is not a solid. Specifically, fluorine and chlorine are a gas, and bromine is a liquid under normal temperature and normal pressure. For example, in the case where the raw material is a liquid, it may be fed into the tank separately from the other raw materials together with the complexing agent, and in the case where the raw material is a gas, the raw material may be fed such that it is blown into the complexing agent having the solid raw materials added thereto.

The production method of a solid electrolyte of the present embodiment is characterized by including mixing the raw material inclusion and the complexing agent, and the electrolyte precursor can also be produced by a method not using an instrument to be used for the purpose of pulverization of solid raw materials, which is generally called a pulverizer, such as a medium type pulverizer, e.g., a ball mill and a bead mill. According to the production method of a solid electrolyte of the present embodiment, by merely mixing the raw material inclusion and the complexing agent, the raw materials and the complexing agent contained in the inclusion are mixed, whereby the electrolyte precursor can be formed. In view of the fact that a mixing time for obtaining the electrolyte precursor can be shortened, or atomization can be performed, the mixture of the raw material inclusion and the complexing agent may be pulverized by a pulverizer.

Examples of an apparatus for mixing the raw material inclusion and the complexing agent include a mechanical agitation type mixer having an impeller provided in a tank. Examples of the mechanical agitation type mixer include a high-speed agitation type mixer and a double arm type mixer, and a high-speed agitation type mixer is preferably used from the viewpoint of increasing the homogeneity of raw materials in the mixture of the raw material inclusion and the complexing agent and obtaining a higher ionic conductivity. In addition, examples of the high-speed agitation type mixer include a vertical axis rotating type mixer and a lateral axis rotating type mixer, and mixers of any of these types may be used.

Examples of a shape of the impeller which is used in the mechanical agitation type mixer include a blade type, an arm type, a ribbon type, a multistage blade type, a double arm type, a shovel type, a twin-shaft blade type, a flat blade type, and a C type blade type. From the viewpoint of increasing the homogeneity of raw materials in the raw material inclusion and obtaining a higher ionic conductivity, a shovel type, a flat blade type, a C type blade type, and the like are preferred.

A temperature condition on the occasion of mixing the raw material inclusion and the complexing agent is not particularly limited, and for example, it is −30 to 100° C., preferably −10 to 50° C., and more preferably around room temperature (23° C.) (for example, (room temperature) ±about 5° C.). In addition, a mixing time is about 0.1 to 150 hours, and from the viewpoint of more uniformly mixing the raw material inclusion and the complexing agent and obtaining a higher ionic conductivity, the mixing time is preferably 1 to 120 hours, more preferably 4 to 100 hours, and still more preferably 8 to 80 hours.

By mixing the raw material inclusion and the complexing agent, owing to an action of the lithium element, the sulfur element, the phosphorus element, and the halogen element, all of which are contained in the raw materials, with the complexing agent, an electrolyte precursor in which these elements are bound directly with each other via and/or not via the complexing agent is obtained. That is, in the production method of a solid electrolyte of the present embodiment, the electrolyte precursor obtained through mixing of the raw material inclusion and the complexing agent is constituted of the complexing agent, the lithium element, the sulfur element, the phosphorus element, and the halogen element, and by mixing the raw material inclusion and the complexing agent, a material containing the electrolyte precursor (hereinafter sometimes referred to as "electrolyte precursor inclusion") is obtained. In the present embodiment, the resulting electrolyte precursor is not one completely dissolved in the complexing agent that is a liquid, and typically, a suspension containing the electrolyte precursor that is a solid is obtained. In consequence, the present production method of a solid electrolyte of the present embodiment is corresponding to a heterogeneous system in a so-called liquid-phase method.

(Pulverization)

It is preferred that the production method of a solid electrolyte of the present embodiment further includes pulverization of the electrolyte precursor. By pulverizing the electrolyte precursor, a solid electrolyte having a small particle diameter is obtained while suppressing the lowering of the ionic conductivity.

The pulverization of the electrolyte precursor in the present embodiment is different from mechanical milling that is a so-called solid-phase method and is not one for obtaining an amorphous or crystalline solid electrolyte owing to a mechanical stress. As mentioned above, the electrolyte precursor contains the complexing agent, and the lithium-containing structure, such as a $PS_4$ structure, and the raw materials containing lithium, such as a lithium halide, are bound (coordinated) with each other via the complexing agent. Then, it may be considered that when the electrolyte precursor is pulverized, fine particles of the electrolyte precursor are obtained while maintaining the aforementioned binding (coordination) and dispersing state. By subjecting this electrolyte precursor to heat treatment, the components bound (coordinated) via the complexing agent are linked with each other at the same time of removal of the complexing agent, and the reaction with the crystalline sulfide solid electrolyte easily takes place. For that reason, growth of large particles owing to aggregation of particles with each other as seen in usual synthesis of a solid electrolyte is hardly generated, and atomization can be readily achieved.

From the viewpoint of performance and production, etc. of an all-solid-battery, it is desired that the particle diameter of the solid electrolyte is small; however, it is not easy to atomize the solid electrolyte through pulverization with a bead mill or the like. It is possible to perform the atomization through wet pulverization using a solvent to some extent; however, the solid electrolyte is liable to be degraded with the solvent, and aggregation is liable to take place during pulverization, resulting in a problem such that an excessive load is applied for the pulverization. On the other hand, even by performing dry pulverization without using a solvent, it is difficult to achieve the atomization in a sub-micron order. Under such circumstances, the fact that the performance of the all-solid-battery can be enhanced, and the production efficiency can be enhanced through easy treatment of performing pulverization of the electrolyte precursor is a significant advantage.

Furthermore, since owing to agitation and mixing following the pulverization, an aggregate via the lithium-containing structure, such as a $PS_4$ structure, or the complexing agent, and an aggregate via the lithium-containing raw material, such as a lithium halide, or the complexing agent are evenly existent, whereby an electrolyte precursor in which the halogen element is more likely dispersed and fixed is obtained, as a result, the effect for obtaining a high ionic conductivity is readily exhibited along with the atomization.

The pulverizer which is used for pulverization of the electrolyte precursor is not particularly restricted so long as it is able to pulverize the particles, and for example, a medium type pulverizer using a pulverization medium can be used. Among medium type pulverizers, taking into account the fact that the electrolyte precursor is in a liquid state or slurry state mainly accompanied by liquids, such as the complexing agent and the solvent, a wet-type pulverizer capable of coping with wet pulverization is preferred.

Representative examples of the wet-type pulverizer include a wet-type bead mill, a wet-type ball mill, and a wet-type vibration mill, and a wet-type bead mill using beads as a pulverization medium is preferred from the standpoint that it is able to freely adjust the condition of a pulverization operation and is easy to cope with materials having a smaller particle diameter. In addition, a dry-type pulverizer, such as a dry-type medium type pulverizer, e.g., a dry-type bead mill, a dry-type ball mill, and a dry-type vibration mill, and a dry-type non-medium pulverizer, e.g., a jet mill, can also be used.

The electrolyte precursor to be pulverized by the pulverizer is typically fed as the electrolyte precursor inclusion which is obtained by mixing the raw material inclusion and the complexing agent and mainly fed in a liquid state or slurry state. That is, an object to be pulverized by the pulverizer mainly becomes an electrolyte precursor inclusion liquid or an electrolyte precursor-containing slurry. Accordingly, the pulverizer which is used in the present embodiment is preferably a flow type pulverizer capable of being optionally subjected to circulation driving of the electrolyte precursor inclusion liquid or electrolyte precursor-containing slurry. More specifically, it is preferred to use a pulverizer of a mode of circulating the electrolyte precursor inclusion liquid or electrolyte precursor-containing slurry between a pulverizer (pulverization mixer) of pulverizing the slurry and a temperature-holding tank (reactor) as disclosed in JP 2010-140893 A.

The size of the bead which is used for the pulverizer may be appropriately selected according to the desired particle diameter and treatment amount and the like, and for example, it may be about 0.05 mmφ or more and 5.0 mmφ or less, and it is preferably 0.1 mmφ or more and 3.0 mmφ, or less, and more preferably 0.3 mmφ or more and 1.5 mmφ or less in terms of a diameter of the bead.

As the pulverizer which is used for pulverization of the electrolyte precursor, a machine capable of pulverizing an object using ultrasonic waves, for example, a machine called an ultrasonic pulverizer, an ultrasonic homogenizer, a probe ultrasonic pulverizer, or the like, can be used.

In this case, various conditions, such as a frequency of ultrasonic waves, may be appropriately selected according to the desired average particle diameter of the electrolyte precursor, and the like. The frequency may be, for example, about 1 kHz or more and 100 kHz or less, and from the viewpoint of more efficiently pulverizing the electrolyte precursor, it is preferably 3 kHz or more and 50 kHz or less, more preferably 5 kHz or more and 40 kHz or less, and still more preferably 10 kHz or more and 30 kHz or less.

An output which the ultrasonic pulverizer has may be typically about 500 to 16,000 W, and it is preferably 600 to 10,000 W, more preferably 750 to 5,000 W, and still more preferably 900 to 1,500 W.

Although an average particle diameter ($D_{50}$) of the electrolyte precursor which is obtained through pulverization is appropriately determined according to the desire, it is typically 0.01 μm or more and 50 μm or less, preferably 0.03 μm or more and 5 μm or less, more preferably 0.05 μm or more and 3 μm or less. By taking such an average particle diameter, it becomes possible to cope with the desire of the solid electrolyte having a small particle diameter as 1 μm or less in terms of an average particle diameter.

A time for pulverization is not particularly restricted so long as it is a time such that the electrolyte precursor has the desired average particle diameter, and it is typically 0.1 hours or more and 100 hours or less. From the viewpoint of efficiently regulating the particle diameter to the desired size, the time for pulverization is preferably 0.3 hours or more and 72 hours or less, more preferably 0.5 hours or more and 48 hours or less, and still more preferably 1 hour or more and 24 hours or less.

The pulverization may be performed after drying the electrolyte precursor, such as the electrolyte precursor inclusion or electrolyte precursor-containing slurry, to form the electrolyte precursor as a powder.

In this case, among the aforementioned pulverizers as exemplified as the pulverizer which may be used in the present production method, any one of the thy-type pulverizers is preferably used. Besides, the items regarding the pulverization, such as a pulverization condition, are the same as those in the pulverization of the electrolyte precursor inclusion or electrolyte precursor-containing slurry, and the average particle diameter of the electrolyte precursor obtained through pulverization is also the same as that as mentioned above.

(Drying)

The production method of a solid electrolyte of the present embodiment may include drying of the electrolyte precursor inclusion (typically, suspension). According to this, a powder of the electrolyte precursor is obtained. By performing drying in advance, it becomes possible to efficiently perform heating. The drying and the subsequent heating may be performed in the same process.

The electrolyte precursor inclusion can be dried at a temperature according to the kind of the remaining complexing agent (complexing agent not incorporated into the electrolyte precursor). For example, the drying can be performed at a temperature of a boiling point of the complexing agent or higher. In addition, the drying can be performed through drying under reduced pressure (vacuum drying) by using a vacuum pump or the like at typically 5 to 100° C., preferably 10 to 85° C., more preferably 15 to 70° C., and still more preferably around room temperature (23° C.) (for example, (room temperature)±about 5° C.), to volatilize the complexing agent.

The drying may be performed by subjecting the electrolyte precursor inclusion to solid-liquid separation by means of filtration with a glass filter or the like, or decantation, or solid-liquid separation with a centrifuge or the like. In the present embodiment, after performing the solid-liquid separation, the drying may be performed under the aforementioned temperature condition.

Specifically, for the solid-liquid separation, decantation in which the electrolyte precursor inclusion is transferred into a container, and after the electrolyte precursor is precipitated, the complexing agent and solvent as a supernatant are removed, or filtration with a glass filter having a pore size of, for example, about 10 to 200 μm, and preferably 20 to 150 μm, is easy.

Figure 3:
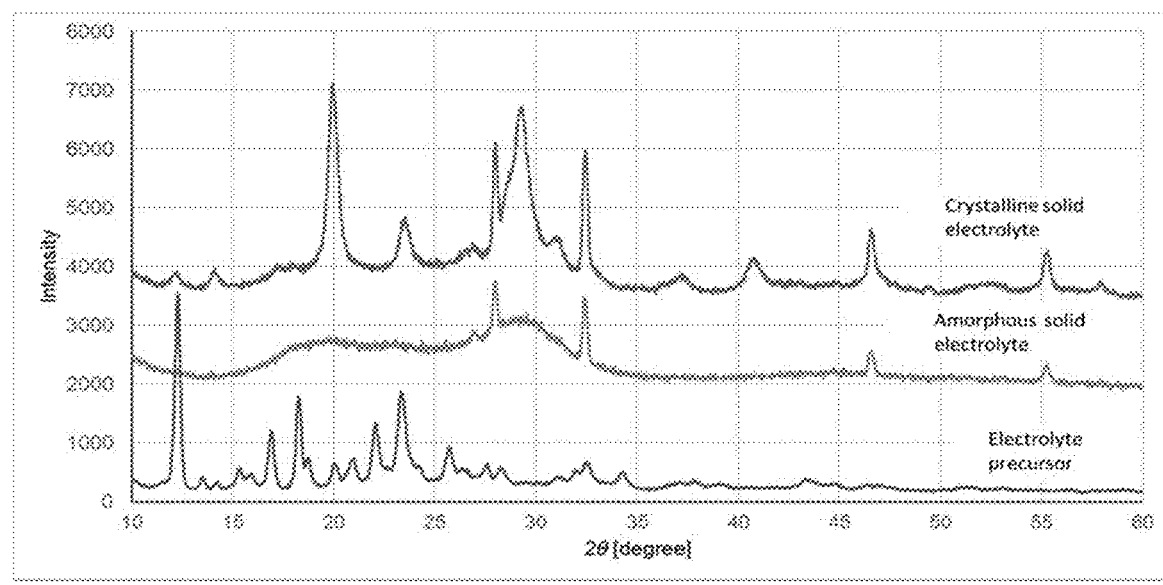
FIG. 3 is an X-ray diffraction spectrum of each of an electrolyte precursor, an amorphous solid electrolyte, and a crystalline solid electrolyte obtained in Example 1.
Figure 4:
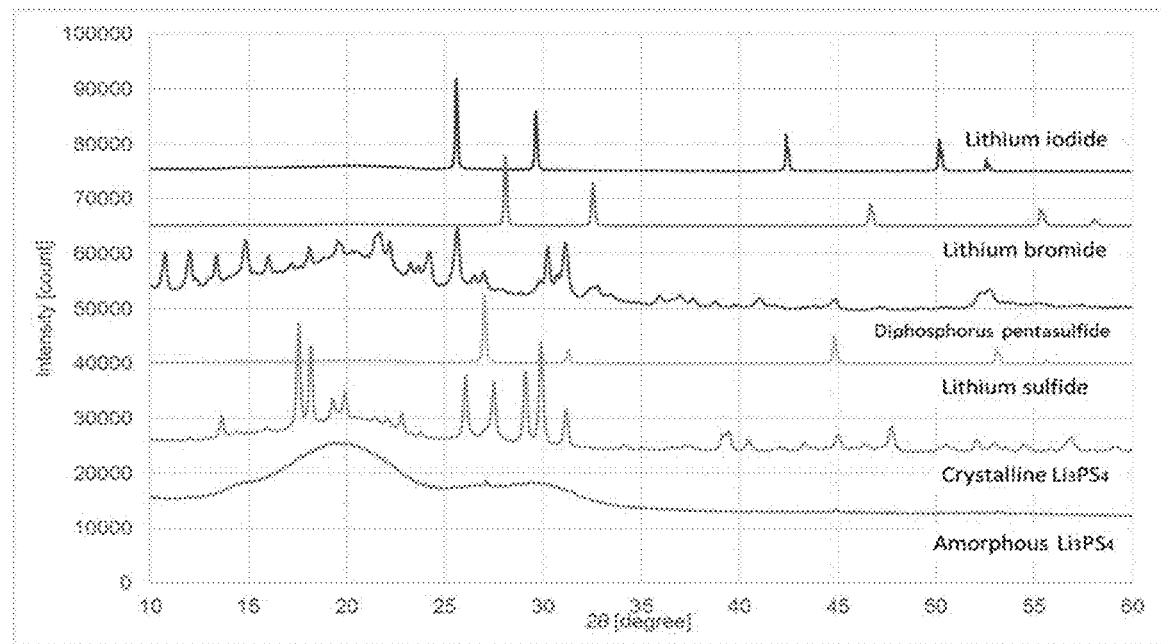
FIG. 4 is an X-ray diffraction spectrum of each of raw materials used in Examples.

The electrolyte precursor has such a characteristic feature that it is constituted of the complexing agent, the lithium element, the sulfur element, the phosphorus element, and the halogen element, and in the X-ray diffraction pattern in the X-ray diffractometry, peaks different from the peaks derived from the raw materials are observed, and it preferably contains a co-crystal constituted of the complexing agent, the lithium element, the sulfur element, the phosphorus element, and the halogen element. When only the raw material inclusion is merely mixed, the peaks derived from the raw materials are merely observed, whereas when the raw material inclusion and the complexing agent are mixed, peaks different from the peaks derived from the raw materials are observed. Thus, the electrolyte precursor (co-crystal) has a structure explicitly different from the raw materials themselves contained in the raw material inclusion. This matter is specifically confirmed in the section of Examples. Measurement examples of the X-ray diffraction patterns of the electrolyte precursor (co-crystal) and the respective raw materials, such as lithium sulfide, are shown in FIGS. 3 and 4, respectively. It is noted from the X-ray diffraction patterns that the electrolyte precursor (co-crystal) has a predetermined crystal structure. In addition, the diffraction pattern of the electrolyte precursor does not contain the diffraction patterns of any raw materials, such as lithium sulfide, as shown in FIG. 4, and thus, it is noted that the electrolyte precursor (co-crystal) has a crystal structure different from the raw materials.

In addition, the electrolyte precursor (co-crystal) has such a characteristic feature that it has a structure different from the crystalline solid electrolyte. This matter is also specifically confirmed in the section of Examples. The X-ray diffraction pattern of the crystalline solid electrolyte is also shown in FIG. 4, and it is noted that the foregoing diffraction pattern is different from the diffraction pattern of the electrolyte precursor (co-crystal). The electrolyte precursor (co-crystal) has the predetermined crystal structure and is also different from the amorphous solid electrolyte having a broad pattern as shown in FIG. 4.

The co-crystal is constituted of the complexing agent, the lithium element, the sulfur element, the phosphorus element, and the halogen element, and typically, it may be presumed that a complex structure in which the lithium element and the other elements are bound directly with each other via and/or not via the complexing agent is formed.

Here, the fact that the complexing agent constitutes the co-crystal can be, for example, confirmed through gas chromatography analysis. Specifically, the complexing agent contained in the co-crystal can be quantitated by dissolving a powder of the electrolyte precursor in methanol and subjecting the obtained methanol solution to gas chromatography analysis.

Although the content of the complexing agent in the electrolyte precursor varies with the molecular weight of the complexing agent, it is typically about 10% by mass or more and 70% by mass or less, and preferably 15% by mass or more and 65% by mass or less.

In the production method of a solid electrolyte of the present embodiment, what the co-crystal containing the halogen element is formed is preferred from the standpoint of enhancing the ionic conductivity. By using the complexing agent, the lithium-containing structure, such as a $PS_4$ structure, and the lithium-containing raw materials, such as a lithium halide, are bound (coordinated) with each other via the complexing agent, the co-crystal in which the halogen element is more likely dispersed and fixed is readily obtained, and the ionic conductivity is enhanced.

The matter that the halogen element in the electrolyte precursor constitutes the co-crystal can be confirmed from the fact that even when the solid-liquid separation of the electrolyte precursor inclusion is performed, the predetermined amount of the halogen element is contained in the electrolyte precursor. This is because the halogen element which does not constitute the co-crystal is easily eluted as compared with the halogen element constituting the co-crystal and discharged into the liquid of solid-liquid separation. In addition, the foregoing matter can also be confirmed from the fact that by performing composition analysis through ICP analysis (inductively coupled plasma atomic emission spectrophotometry) of the electrolyte precursor or solid electrolyte, a proportion of the halogen element in the electrolyte precursor or solid electrolyte is not remarkably lowered as compared with a proportion of the halogen element fed from the raw materials.

The amount of the halogen element remaining in the electrolyte precursor is preferably 30% by mass or more, more preferably 35% by mass or more, and still more preferably 40% by mass or more relative to the charged composition. An upper limit of the halogen element remaining in the electrolyte precursor is 100% by mass.

(Heating)

It is preferred that the production method of a solid electrolyte of the present embodiment includes heating of the electrolyte precursor to obtain the amorphous solid electrolyte; and heating of the electrolyte precursor or amorphous solid electrolyte to obtain the crystalline solid electrolyte. In view of the fact that heating of the electrolyte precursor is included, the complexing agent in the electrolyte precursor is removed, and the amorphous solid electrolyte and the crystalline solid electrolyte each containing the lithium element, the sulfur element, the phosphorus element, and the halogen element are obtained. In addition, the electrolyte precursor to be heated by the present heating may be an electrolyte precursor pulverized product which has been pulverized through the aforementioned pulverization.

Here, the fact that the complexing agent in the electrolyte precursor is removed is supported by the facts that in addition to the fact that it is evident from the results of the X-ray diffraction pattern, the gas chromatography analysis, and the like that the complexing agent constitutes the co-crystal of the electrolyte precursor, the solid electrolyte obtained by removing the complexing agent through heating of the electrolyte precursor is identical in the X-ray diffraction pattern with the solid electrolyte obtained by the conventional method without using the complexing agent.

In the production method of the present embodiment, the solid electrolyte is obtained by heating the electrolyte precursor to remove the complexing agent in the electrolyte precursor, and it is preferred that the content of the complexing agent in the solid electrolyte is low as far as possible. However, the complexing agent may be contained to an extent that the performance of the solid electrolyte is not impaired. The content of the complexing agent in the solid electrolyte may be typically 10% by mass or less, and it is preferably 5% by mass or less, more preferably 3% by mass or less, and still more preferably 1% by mass or less.

In the production method of the present embodiment, in order to obtain the crystalline solid electrolyte, it may be obtained by heating the electrolyte precursor, or it may be obtained by heating the electrolyte precursor to obtain the amorphous solid electrolyte and then heating the amorphous solid electrolyte. That is, in the production method of the present embodiment, the amorphous solid electrolyte can also be produced.

Conventionally, in order to obtain a crystalline solid electrolyte having a high ionic conductivity, for example, a solid electrolyte having a thio-LISICON Region II-type crystal structure as mentioned later, it was required that an amorphous solid electrolyte is prepared through mechanical pulverization treatment, such as mechanical milling, or other melt quenching treatment or the like, and then, the amorphous solid electrolyte is heated. But, it may be said that the production method of the present embodiment is superior to the conventional production method by mechanical milling treatment or the like from the standpoint that a crystalline solid electrolyte having a thio-LISICON Region II-type crystal structure is obtained even by a method of not performing mechanical pulverization treatment, other melt quenching treatment, or the like.

In the production method of a solid electrolyte of the present embodiment, whether or not the amorphous solid electrolyte is obtained, whether or not the crystalline solid electrolyte is obtained, whether or not after obtaining the amorphous solid electrolyte, the crystalline solid electrolyte is obtained, or whether or not the crystalline solid electrolyte is obtained directly from the electrolyte precursor is appropriately selected according to the desire, and is able to be adjusted by the heating temperature, the heating time, or the like.

For example, in the case of obtaining the amorphous solid electrolyte, the heating temperature of the electrolyte precursor may be determined according to the structure of the crystalline solid electrolyte which is obtained by heating the amorphous solid electrolyte (or the electrolyte precursor). Specifically, the heating temperature may be determined by subjecting the amorphous solid electrolyte (or the electrolyte precursor) to differential thermal analysis (DTA) with a differential thermal analysis device (DTA device) under a temperature rise condition of 10° C./min and adjusting the temperature to a range of preferably 5° C. or lower, more preferably 10° C. or lower, and still more preferably 20° C. or lower starting from a peak top temperature of the exothermic peak detected on the lowermost temperature side. Although a lower limit thereof is not particularly restricted, it may be set to a temperature of about [(peak top temperature of the exothermic peak detected on the lowermost temperature side)−40° C.] or higher. By regulating the heating temperature to such a temperature range, the amorphous solid electrolyte is obtained more efficiently and surely. Although the heating temperature for obtaining the amorphous solid electrolyte cannot be unequivocally prescribed because it varies with the structure of the resulting crystalline solid electrolyte, in general, it is preferably 135° C. or lower, more preferably 130° C. or lower, and still more preferably 125° C. or lower. Although a lower limit of the heating temperature is not particularly limited, it is preferably 90° C. or higher, more preferably 100° C. or higher, and still more preferably 110° C. or higher.

In the case of obtaining the crystalline solid electrolyte by heating the amorphous solid electrolyte or directly from the electrolyte precursor, the heating temperature may be determined according to the structure of the crystalline solid electrolyte, and it is preferably higher than the aforementioned heating temperature for obtaining the amorphous solid electrolyte. Specifically, the heating temperature may be determined by subjecting the amorphous solid electrolyte (or the electrolyte precursor) to differential thermal analysis (DTA) with a differential thermal analysis device (DTA device) under a temperature rise condition of 10° C./min and adjusting the temperature to a range of preferably 5° C. or higher, more preferably 10° C. or higher, and still more preferably 20° C. or higher starting from a peak top temperature of the exothermic peak detected on the lowermost temperature side. Although an upper limit thereof is not particularly restricted, it may be set to a temperature of about [(peak top temperature of the exothermic peak detected on the lowermost temperature side)+40° C.] or lower. By regulating the heating temperature to such a temperature range, the crystalline solid electrolyte is obtained more efficiently and surely. Although the heating temperature for obtaining the crystalline solid electrolyte cannot be unequivocally prescribed because it varies with the structure of the resulting crystalline solid electrolyte, in general, it is preferably 130° C. or higher, more preferably 135° C. or higher, and still more preferably 140° C. or lower. Although an upper limit of the heating temperature is not particularly limited, it is preferably 300° C. or lower, more preferably 280° C. or lower, and still more preferably 250° C. or lower.

Although the heating time is not particularly limited so long as it is a time for which the desired amorphous solid electrolyte or crystalline solid electrolyte is obtained, for example, it is preferably 1 minute or more, more preferably 10 minutes or more, still more preferably 30 minutes or more, and yet still more preferably 1 hour or more. In addition, though an upper limit of the heating temperature is not particularly restricted, it is preferably 24 hours or less, more preferably 10 hours or less, still more preferably 5 hours or less, and yet still more preferably 3 hours or less.

It is preferred that the heating is performed in an inert gas atmosphere (for example, a nitrogen atmosphere and an argon atmosphere) or in a reduced pressure atmosphere (especially, in vacuo). This is because deterioration (for example, oxidation) of the crystalline solid electrolyte can be prevented from occurring. Although a method for heating is not particularly limited, for example, a method of using a hot plate, a vacuum heating device, an argon gas atmosphere furnace, or a firing furnace can be adopted. In addition, industrially, a lateral dryer or a lateral vibration fluid dryer provided with a heating means and a feed mechanism, or the like may be selected according to the heating treatment amount.

(Amorphous Solid Electrolyte)

The amorphous solid electrolyte which is obtained by the production method of a solid electrolyte of the present embodiment contains the lithium element, the sulfur element, the phosphorus element, and the halogen element. As representative examples thereof, there are preferably exemplified solid electrolytes constituted of lithium sulfide, phosphorus sulfide, and a lithium halide, such as $Li_2S$—$P_2S_5$—LiI, $Li_2S$—$P_2S_5$—LiCl, $Li_2S$—$P_2S_5$—LiBr, and $Li_2S$—$P_2S_5$—LiI—LiBr; and solid electrolytes further containing other element, such as an oxygen element and a silicon element, for example, $Li_2S$—$P_2S_5$—$Li_2O$—LiI and $Li_2S$—$SiS_2$—$P_2S_5$—LiI. From the viewpoint of obtaining a higher ionic conductivity, solid electrolytes constituted of lithium sulfide, phosphorus sulfide, and a lithium halide, such as $Li_2S$—$P_2S_5$—LiI, $Li_2S$—$P_2S_5$—LiCl, $Li_2S$—$P_2S_5$—LiBr, and $Li_2S$—$P_2S_5$—LiI—LiBr, are preferred.

The kinds of the elements constituting the amorphous solid electrolyte can be confirmed by, for example, an inductivity coupled plasma optical emission spectrometer (ICP).

In the case where the amorphous solid electrolyte obtained in the production method of a solid electrolyte of the present embodiment is one having at least $Li_2S$—$P_2S_5$, from the viewpoint of obtaining a higher ionic conductivity, a molar ratio of $Li_2S$ to $P_2S_5$ is preferably (65 to 85)/(15 to 35), more preferably (70 to 80)/(20 to 30), and still more preferably (72 to 78)/(22 to 28).

In the case where the amorphous solid electrolyte obtained in the production method of a solid electrolyte of the present embodiment is $Li_2S$—$P_2S_5$—LiI—LiBr, the total content of lithium sulfide and phosphorus pentasulfide is preferably 60 to 95 mol %, more preferably 65 to 90 mol %, and still more preferably 70 to 85 mol %. In addition, a proportion of lithium bromide relative to the total of lithium bromide and lithium iodide is preferably 1 to 99 mol %, more preferably 20 to 90 mol %, still more preferably 40 to 80 mol %, and especially preferably 50 to 70 mol %.

In the amorphous solid electrolyte obtained in the production method of a solid electrolyte of the present embodiment, a blending ratio (molar ratio) of lithium element to sulfur element to phosphorous element to halogen atom is preferably (1.0 to 1.8)/(1.0 to 2.0)/(0.1 to 0.8)/(0.01 to 0.6), more preferably (1.1 to 1.7)/(1.2 to 1.8)/(0.2 to 0.6)/(0.05 to 0.5), and still more preferably (1.2 to 1.6)/(1.3 to 1.7)/(0.25 to 0.5)/(0.08 to 0.4). In addition, in the case of using a combination of bromine and iodine as the halogen element, a blending ratio (molar ratio) of lithium element to sulfur element to phosphorus element to bromine to iodine is preferably (1.0 to 1.8)/(1.0 to 2.0)/(0.1 to 0.8)/(0.01 to 3.0)/(0.01 to 0.3), more preferably (1.1 to 1.7)/(1.2 to 1.8)/(0.2 to 0.6)/(0.02 to 0.25)/(0.02 to 0.25), still more preferably (1.2 to 1.6)/(1.3 to 1.7)/(0.25 to 0.5)/(0.03 to 0.2)/(0.03 to 0.2), and yet still more preferably (1.35 to 1.45)/(1.4 to 1.7)/(0.3 to 0.45)/(0.04 to 0.18)/(0.04 to 0.18). By allowing the blending ratio (molar ratio) of lithium element to sulfur element to phosphorus element to halogen element to fall within the aforementioned range, it becomes easy to provide a solid electrolyte having a thio-LISICON Region II-type crystal structure and having a higher ionic conductivity.

Although the shape of the amorphous solid electrolyte is not particularly restricted, examples thereof include a granular shape. The average particle diameter ($D_{50}$) of the granular amorphous solid electrolyte is, for example, within a range of 0.01 to 500 μm, and preferably 0.1 to 200 μm.

(Crystalline Solid Electrolyte)

The crystalline solid electrolyte obtained by the production method of a solid electrolyte of the present embodiment may be a so-called glass ceramics which is obtained by heating the amorphous solid electrolyte to a crystallization temperature or higher. Examples of a crystal structure thereof include an $Li_3PS_4$ crystal structure, an $Li_4P_2S_6$ crystal structure, an $Li_7PS_6$ crystal structure, an $Li_7P_3S_{11}$ crystal structure, and a crystal structure having peaks at around of $2\theta=20.2°$ and $23.6°$ (see, for example, JP 2013-16423 A).

In addition, examples thereof include an $Li_{4-x}Ge_{1-x}P_xS_4$-based thio-LISICON Region II-type crystal structure (see Kanno, et al., Journal of The Electrochemical Society, 148 (7) A742-746 (2001)) and a crystal structure similar to the $Li_{4-x}Ge_{1-x}P_xS_4$-based thio-LISICON Region II-type crystal structure (see Solid State Ionics, 177 (2006), 2721-2725). Among them, the thio-LISICON Region II-type crystal structure is preferred as the crystal structure of the crystalline solid electrolyte obtained by the production method of a solid electrolyte of the present embodiment from the standpoint that a higher ionic conductivity is obtained. Here, the "thio-LISICON Region II-type crystal structure" expresses any one of an $Li_{4-x}Ge_{1-x}P_xS_4$-based thio-LISICON Region II-type crystal structure and a crystal structure similar to the $Li_{4-x}Ge_{1-x}P_xS_4$-based thio-LISICON Region II-type crystal structure. In addition, though the crystalline solid electrolyte obtained by the production method of a solid electrolyte of the present embodiment may be one having the aforementioned thio-LISICON Region II-type crystal structure or may be one having the thio-LISICON Region II-type crystal structure as a main crystal, it is preferably one having the thio-LISICON Region II-type crystal structure as a main crystal. In this specification, the wording "having as a main crystal" means that a proportion of the crystal structure serving as an object in the crystal structure is 80% or more, and it is preferably 90% or more, and more preferably 95% or more. In addition, from the viewpoint of obtaining a higher ionic conductivity, the crystalline solid electrolyte obtained by the production method of a solid electrolyte of the present embodiment is preferably one not containing crystalline $Li_3PS_4$ (ß-$Li_3PS_4$).

In the X-ray diffractometry using a CuKα ray, the $Li_3PS_4$ crystal structure gives diffraction peaks, for example, at around $2\theta=17.5°$, $18.3°$, $26.1°$, $27.3°$, and $30.0°$; the $Li_1P_2S_6$ crystal structure gives diffraction peaks, for example, at around $2\theta=16.9°$, $27.1°$, and $32.5°$; the $Li_7PS_6$ crystal structure gives diffraction peaks, for example, at around $2\theta=15.3°$, $25.2°$, $29.6°$, and $31.0°$; the $Li_7P_3S_{11}$ crystal structure gives diffraction peaks, for example, at around $2\theta=17.8°$, $18.5°$, $19.7°$, $21.8°$, $23.7°$, $25.9°$, $29.6°$, and $30.0°$; the $Li_{4-x}Ge_{1-x}P_xS_4$-based thio-LISICON Region II-type crystal structure gives diffraction peaks, for example, at around $2\theta=20.1°$, $23.9°$, and $29.5°$; and the crystal structure similar to the $Li_{4-x}Ge_{1-x}P_xS_4$-based thio-LISICON Region II-type crystal structure gives diffraction peaks, for example, at around $2\theta=20.2°$ and $23.6°$. The position of these peaks may vary within a range of $\pm 0.5°$.

As mentioned above, in the case when the thio-LISICON Region II-type crystal structure is obtained in the present embodiment, the foregoing crystal structure is preferably one not containing crystalline $Li_3PS_4$ (ß-$Li_3PS_4$). FIG. 3 shows an X-ray diffractometry example of the crystalline solid electrolyte obtained by the production method of the present embodiment. In addition, FIG. 4 shows an X-ray diffractometry example of crystalline $Li_3PS_4$ (ß-$Li_3PS_4$). As grasped from FIGS. 3 and 4, the solid electrolyte of the present embodiment does not have diffraction peaks at $2\theta=17.5°$ and $26.1°$, or even in the case where it has diffraction patterns, extremely small peaks as compared with the diffraction peaks of the thio-LISICON Region II-type crystal structure are merely detected.

The crystal structure represented by a compositional formula $Li_{7-x}P_{1-y}Si_yS_6$ or $Li_{7+x}P_{1-y}Si_yS_6$ (x is −0.6 to 0.6, and y is 0.1 to 0.6), which has the aforementioned structure skeleton of $Li_7PS_6$ and in which a part of P is substituted with Si, is a cubic crystal or a rhombic crystal, and is preferably a cubic crystal, and in X-ray diffractometry using a CuKα ray, the crystal structure gives peaks appearing mainly at 2θ=15.5°, 18.0°, 25.0°, 30.0°, 31.4°, 45.3°, 47.0°, and 52.0°. The crystal structure represented by the aforementioned compositional formula $Li_{7-x-2y}PS_{6-x-y}Cl_x$ (0.8≤x≤1.7, and 0<y≤(−0.25x+0.5)) is preferably a cubic crystal, and in the X-ray diffractometry using a CuKα ray, the crystal structure gives peaks appearing mainly at 2θ=15.5°, 18.0°, 25.0°, 30.0°, 31.4°, 45.3°, 47.0°, and 52.0°. The crystal structure represented by the aforementioned compositional formula $Li_{7-x}PS_{6-x}Ha_x$ (Ha represents Cl or Br, and x is preferably 0.2 to 1.8) is preferably a cubic crystal, and in the X-ray diffractometry using a CuKα ray, the crystal structure gives peaks appearing mainly at 2θ=15.5°, 18.0°, 25.0°, 30.0°, 31.4°, 45.3°, 47.0°, and 52.0°.

These peak positions may vary within a range of ±0.5°.

Although the shape of the crystalline solid electrolyte is not particularly restricted, examples thereof include a granular shape. The average particle diameter ($D_{50}$) of the granular amorphous solid electrolyte is, for example, within a range of 0.01 to 500 μm, and preferably 0.1 to 200 μm.

Embodiment B

Next, the Embodiment B is described.

The Embodiment B is concerned with a mode in which in the production method of the present embodiment including mixing a raw material inclusion containing a lithium element, a sulfur element, a phosphorus element, and a halogen element with a complexing agent containing a compound having at least two tertiary amino groups in the molecule, raw materials containing, as the raw material inclusion, a solid electrolyte, such as $Li_3PS_4$, and the like and the complexing agent are used. In the Embodiment A, the electrolyte precursor is formed while synthesizing the lithium-containing structure, such as $Li_3PS_4$, existent as a main structure in the solid electrolyte obtained by the production method of the present embodiment, through reaction among the raw materials, such as lithium sulfide, and therefore, it may be considered that a constitution ratio of the aforementioned structure is liable to become small.

Then, in the Embodiment B, a solid electrolyte containing the aforementioned structure is previously prepared by means of production or the like, and this is used as the raw material. According to this, an electrolyte precursor in which the aforementioned structure and the raw materials containing lithium, such the lithium halide, are bound (coordinated) with each other via the complexing agent, and the halogen element is dispersed and fixed is more likely obtained. As a result, a solid electrolyte having a high ionic conductivity, in which the generation of hydrogen sulfide is suppressed, is obtained.

Examples of the raw material containing a lithium element, a sulfur element, and a phosphorus element, which may be used in the Embodiment B, include an amorphous electrolyte or crystalline solid electrolyte having a $PS_4$ structure as a molecular structure. From the viewpoint of suppressing the generation of hydrogen sulfide, a $P_2S_7$ structure-free amorphous solid electrolyte or crystalline electrolyte is preferred. As such a solid electrolyte, ones produced by a conventionally existing production method, such as a mechanical milling method, a slurry method, and a melt quenching method, can be used, and commercially available products can also be used.

In this case, the solid electrolyte containing a lithium element, a sulfur element, and a phosphorus element is preferably an amorphous electrolyte. The dispersibility of the halogen element in the electrolyte precursor is enhanced, and the halogen element is easily bound with the lithium element, the sulfur element, and the phosphorus element in the solid electrolyte, and as a result, a solid electrolyte having a higher ionic conductivity can be obtained.

Figure 6:
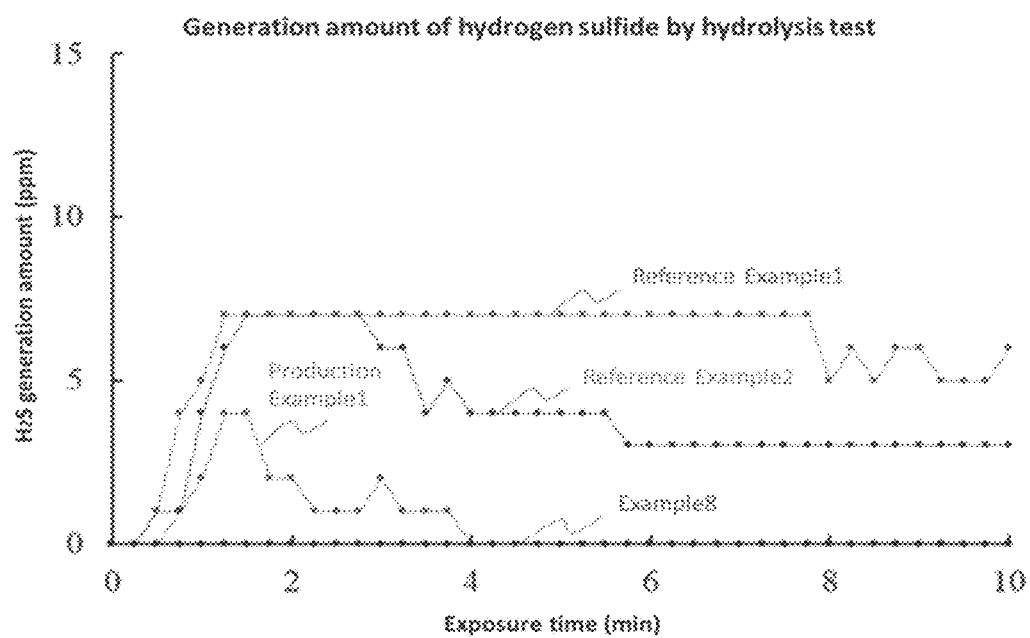
FIG. 6 is a graph showing a change with time of generation amount of hydrogen sulfide by an exposure test.
Figure 7:
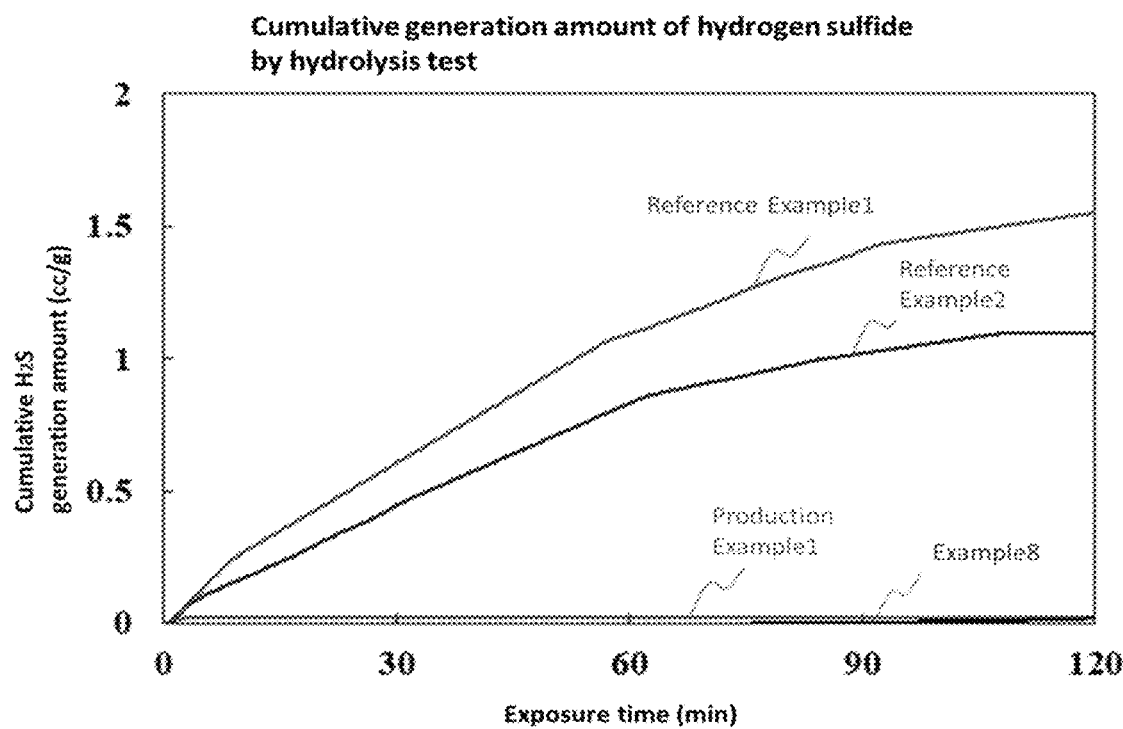
FIG. 7 is a graph showing a change with time of cumulative generation amount of hydrogen sulfide by an exposure test.

FIGS. 6 and 7 each show the evaluation examples of the generation amount of hydrogen sulfide of the crystalline solid electrolyte obtained in the production method of the present embodiment. In the crystalline solid electrolyte according to the present embodiment, the generation of hydrogen sulfide is not substantially perceived, and it is noted that the generation amount of hydrogen sulfide is conspicuously suppressed as compared with that in the crystalline solid electrolyte by the conventional method along with mechanical milling. As for the suppression of the generation amount of hydrogen sulfide, the fact that lithium sulfide is not used as the raw material; the fact that the $P_2S_7$ structure is not contained as the main structure of the electrolyte; the fact that a halogen element with high water absorbency is contained in the electrolyte structure; and so on may be considered as the reasons. The Embodiment B is able to provide a crystalline solid electrolyte in which a higher ionic conductivity is realized by the liquid-phase method, and at the same time, the generation amount of hydrogen sulfide is extremely low as not seen traditionally.

Figure 8:
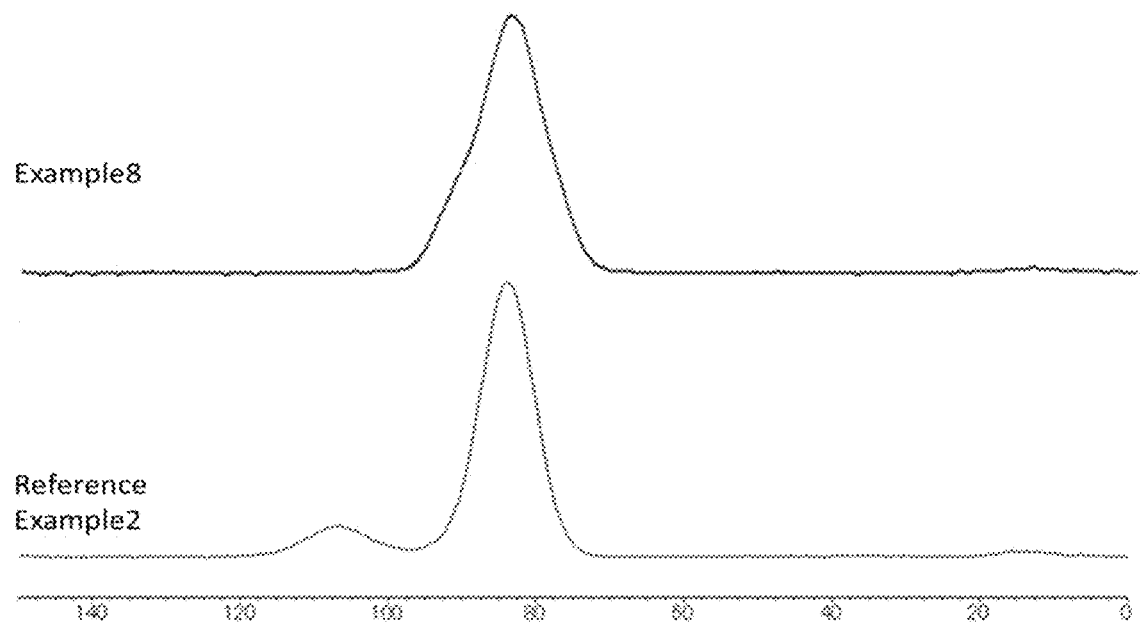
FIG. 8 is a solid $^{31}$P-NMR spectrum of an amorphous solid electrolyte obtained in each of Example 8 and Reference Example 2.
Figure 9:
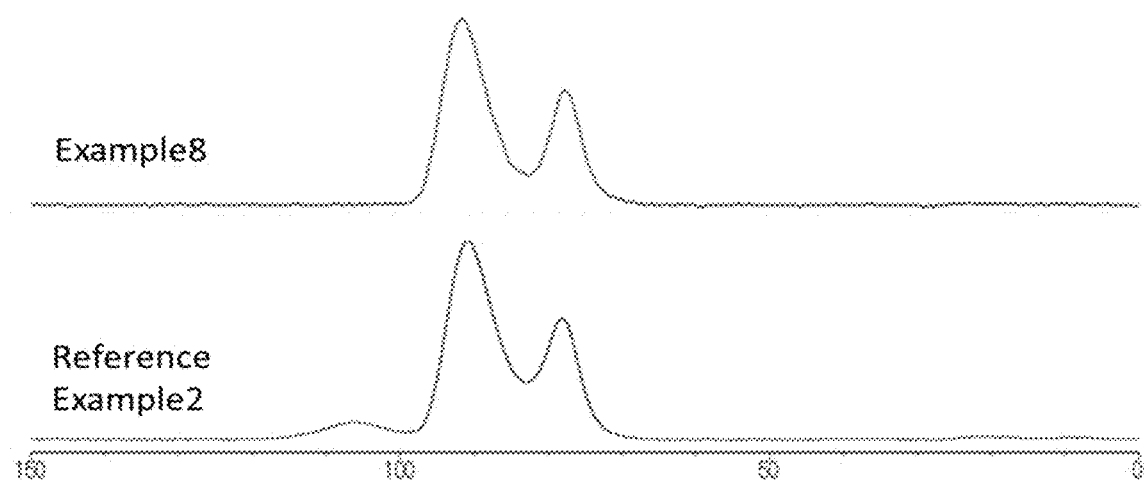
FIG. 9 is a solid $^{31}$P-NMR spectrum of a crystalline solid electrolyte obtained in each of Example 8 and Reference Example 2.

The structure of the solid electrolyte can be observed through solid $^{31}$P-NMR spectrometry. Tables 5 and 6 and FIGS. 8 and 9 show solid $^{31}$P-NMR spectrometry examples of an amorphous solid electrolyte and a crystalline solid electrolyte, each of which is obtained by heating the electrolyte precursor according to the present embodiment, and an amorphous solid electrolyte and a crystalline solid electrolyte, each of which is obtained by the conventional solid-phase method. As grasped from Table 5 and FIG. 8, in the amorphous solid electrolyte by the conventional solid-phase method, peaks of a $PS_4^{3-}$ structure, a $P_2S_7^{4-}$ structure, and a $P_2S_6^{4-}$ structure ($P_xS_y^{a-}$ structure) assigned to glass appear. In contrast, the glass component contained in the amorphous solid electrolyte according to the present embodiment is only the $PS_4^{3-}$ structure, but the $P_2S_7^{4-}$ structure and so on are not observed.

Furthermore, in the crystalline solid electrolyte (Table 6 and FIG. 9), in the crystalline solid electrolyte according to the conventional solid-phase method, a $P_2S_6^{4-}$ structure (glass) is observed, whereas the glass component contained in the crystalline solid electrolyte according to the present embodiment is only the $PS_4^{3-}$ structure. In the Embodiment B, in view of the fact that the amorphous solid electrolyte having a $PS_4^4$ structure and the like are used without using $Li_2S$ as the raw material, for example, a crystalline solid electrolyte which does not contain a $P_2S_7^{4-}$ structure ($Li_4P_2S_7$) and the like which may be produced during a reaction process between $Li_2S$ and $P_2S_5$ and in which the generation amount of hydrogen sulfide is extremely low is obtained.

In the embodiment B, the content of the amorphous electrolyte having a $PS_4$ structure or the like is preferably 60 to 100 mol %, more preferably 65 to 90 mol %, and still more preferably 70 to 80 mol % relative to the total of the raw materials.

In the case of using the amorphous electrolyte having a $PS_4$ structure or the like and the halogen simple substance, the content of the halogen simple substance is preferably 1 to 50 mol %, more preferably 2 to 40 mol %, still more preferably 3 to 25 mol %, and yet still more preferably 3 to 15 mol % relative to the amorphous electrolyte having a $PS_4$ structure or the like.

Besides, in the case of using the halogen simple substance and the lithium halide and the case of using the two halogen simple substances, the same as in the Embodiment A is applicable.

In the Embodiment B, in all other cases than the raw materials, for example, the complexing agent, the mixing, the heating, the drying, the amorphous solid electrolyte, and the crystalline solid electrolyte, and the like are the same as those described in the Embodiment A.

In the Embodiment B, the matter that what the electrolyte precursor is pulverized is preferred, the pulverizer to be used for pulverization, the matter that after mixing or after drying, the pulverization may be performed, various conditions regarding pulverization, and so on are also the same as those in the Embodiment A.

Embodiments C and D

Figure 2:
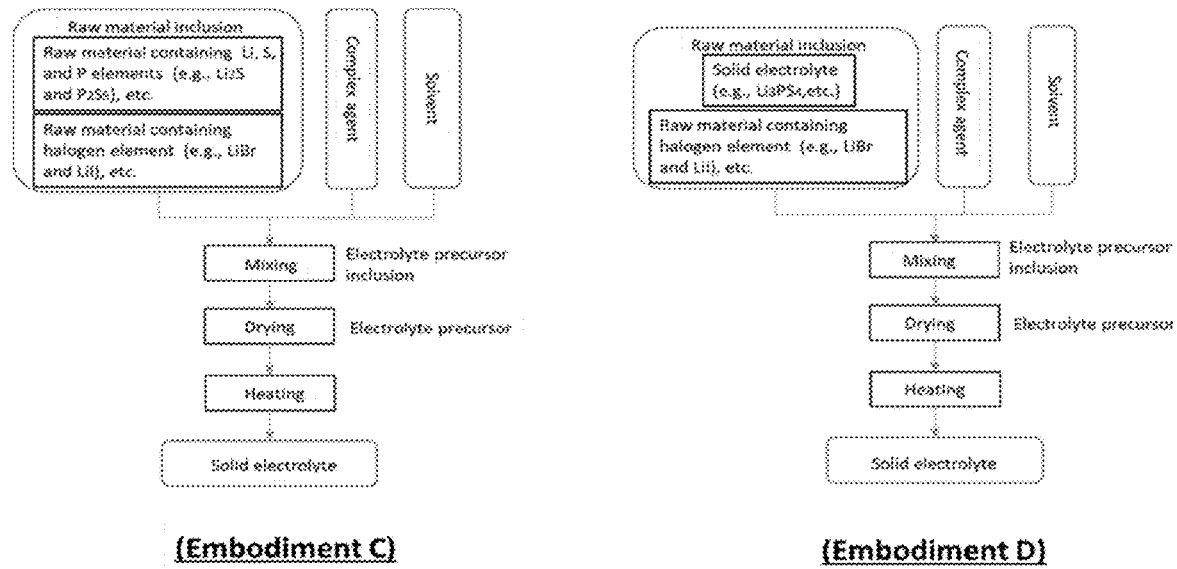
FIG. 2 is a flow chart of explaining one example of preferred modes of a production method of the present embodiment.

As shown in the flow chart of FIG. 2, the Embodiments C and D are different from the Embodiments A and B, respectively from the standpoint that a solvent is added to the raw material inclusion and the complexing agent containing a compound having at least two tertiary amino group in the molecule. The Embodiments C and D are concerned with a heterogeneous method of solid-liquid coexistence, whereas in the Embodiments A and B, the electrolyte precursor that is a solid is formed in the complexing agent that is a liquid. At this time, when the electrolyte precursor is easily soluble in the complexing agent, there is a case where separation of the components is generated. In the Embodiments C and D, by using a solvent in which the electrolyte precursor is insoluble, elution of the components in the electrolyte precursor can be suppressed.

(Solvent)

In the production method of a solid electrolyte of the Embodiments C and D, it is preferred to add the solvent to the raw material inclusion and the complexing agent. In view of the fact that the raw material inclusion and the complexing agent are mixed using the solvent, an effect to be brought by using the complexing agent, namely an effect in which formation of the electrolyte precursor acting with the lithium element, the sulfur element, the phosphorus element, and the halogen element is promoted, an aggregate via the lithium-containing structure, such as a $PS_4$ structure, or the complexing agent, and an aggregate via the lithium-containing raw material, such as a lithium halide, or the complexing agent are evenly existent, whereby an electrolyte precursor in which the halogen element is more likely dispersed and fixed is obtained, as a result, an effect for obtaining a high ionic conductivity is easily exhibited.

The production method of a solid electrolyte of the present embodiment is a so-called heterogeneous method, and it is preferred that the electrolyte precursor is not completely dissolved in the complexing agent that is a liquid but deposited. In the Embodiments C and D, by adding the solvent, the solubility of the electrolyte precursor can be adjusted. In particular, the halogen element is liable to be eluted from the electrolyte precursor, and therefore, by adding the solvent, the elution of the halogen element is suppressed, whereby the desired electrolyte precursor is obtained. As a result, a crystalline solid electrolyte having a high ionic conductivity, in which the generation of hydrogen sulfide is suppressed, can be obtained via the electrolyte precursor in which the components, such as a halogen, are dispersed.

As the solvent having such properties, a solvent having a solubility parameter of 10 or less is preferably exemplified. In this specification, the solubility parameter is described in various literatures, for example, "Handbook of Chemistry" (published in 2004, Revised 5th Edition, by Maruzen Publishing Co., Ltd.) and is a value δ ($(cal/cm^3)^{1/2}$) calculated according to the following numerical formula (1), which is also called a Hildebrand parameter, SP value.

$$\sigma = \sqrt{(\Delta H - RT)/V} \qquad (1)$$

In the numerical formula (1), ΔH is a molar heating value; R is a gas constant; T is a temperature; and V is molar volume.

By using the solvent having a solubility parameter of 10 or less, the solvent has such properties that as compared by the aforementioned complexing agent, it relatively hardly dissolves the halogen element, the raw materials containing a halogen element, such as a lithium halide, and further the halogen element-containing component constituting the co-crystal contained in the electrolyte precursor (for example, an aggregate in which lithium halide and the complexing agent are bound with each other); it is easy to fix the halogen element within the electrolyte precursor; the halogen element is existent in a favorable state in the resulting electrolyte precursor and further the solid electrolyte; and a solid electrolyte having a high ionic conductivity is readily obtained. That is, it is preferred that the solvent which is used in the present embodiment has such properties that it does not dissolve the electrolyte precursor. From the same viewpoint, the solubility parameter of the solvent is preferably 9.5 or less, more preferably 9.0 or less, and still more preferably 8.5 or less.

More specifically, as the solvent which is used in the production method of a solid electrolyte of the Embodiments C and D, it is possible to broadly adopt a solvent which has hitherto been used in the production of a solid electrolyte. Examples thereof include hydrocarbon solvents, such as an aliphatic hydrocarbon solvent, an alicyclic hydrocarbon solvent, and an aromatic hydrocarbon solvent; and carbon atom-containing solvents, such as an alcohol-based solvent, an ester-based solvent, an aldehyde-based solvent, a ketone-based solvent, an ether-based solvent, and a solvent containing a carbon atom and a hetero atom. Of these, preferably, a solvent having a solubility parameter falling within the aforementioned range may be appropriately selected and used.

More specifically, examples of the solvent include an aliphatic hydrocarbon solvent, such as hexane (7.3), pentane (7.0), 2-ethylhexane, heptane (7.4), octane (7.5), decane, undecane, dodecane, and tridecane; an alicyclic hydrocarbon solvent, such as cyclohexane (8.2) and methylcyclohexane; an aromatic hydrocarbon solvent, such as benzene, toluene (8.8), xylene (8.8), mesitylene, ethylbenzene (8.8), tert-butylbenzene, trifluoromethylbenzene, nitrobenzene, chlorobenzene (9.5), chlorotoluene (8.8), and bromobenzene; an alcohol-based solvent, such as ethanol (12.7) and butanol (11.4); an ester-based solvent, such as ethyl acetate (9.1) and butyl acetate (8.5); an aldehyde-based solvent, such as formaldehyde, acetaldehyde (10.3), and dimethylformamide (12.1); a ketone-based solvent, such as acetone (9.9) and methyl ethyl ketone; an ether-based solvent, such as diethyl ether (7.4), diisopropyl ether (6.9), dibutyl ether, tetrahydrofuran (9.1), dimethoxyethane (7.3), cyclopentylmethyl ether (8.4), tert-butylmethyl ether, and anisole; and a solvent containing a carbon atom and a hetero atom, such as acetonitrile (11.9), dimethyl sulfoxide, and carbon disulfide. The numerical values within the parentheses in the aforementioned exemplifications are an SP value.

Of these solvents, an aliphatic hydrocarbon solvent, an alicyclic hydrocarbon solvent, an aromatic hydrocarbon solvent, and an ether-based solvent are preferred; from the viewpoint of obtaining a higher ionic conductivity more stably, heptane, cyclohexane, toluene, ethylbenzene, diethyl ether, diisopropyl ether, dibutyl ether, dimethoxyethane, cyclopentylmethyl ether, tert-butylmethyl ether, and anisole are more preferred; diethyl ether, diisopropyl ether, and dibutyl ether are still more preferred; diisopropyl ether and dibutyl ether are yet still more preferred; and dibutyl ether is especially preferred. The solvent which is used in the present embodiment is preferably the organic solvent as exemplified above and is an organic solvent different from the aforementioned complexing agent. In the present embodiment, these solvents may be used alone or in combination of plural kinds thereof.

In the case of using the solvent, the content of the raw materials in the raw material inclusion may be regulated to one relative to one liter of the total amount of the complexing agent and the solvent. In addition, the content of the complexing agent relative to the total amount of the complexing agent and the solvent is preferably 10% by mass or more, more preferably 15% by mass or more, and still more preferably 20% by mass or more, and an upper limit thereof is preferably 65% by mass or less, more preferably 60% by mass or less, and still more preferably 55% by mass or less.

As for drying in the Embodiments C and D, the electrolyte precursor inclusion can be dried at a temperature according to the kind of each of the remaining complexing agent (complexing agent not incorporated into the electrolyte precursor) and the solvent. For example, the drying can be performed at a temperature of a boiling point of the complexing agent or solvent or higher. In addition, the drying can be performed through drying under reduced pressure (vacuum drying) by using a vacuum pump or the like at typically 5 to 100° C., preferably 10 to 85° C., more preferably 15 to 70° C., and still more preferably around room temperature (23° C.) (for example, (room temperature) ±about 5° C.), to volatilize the complexing agent and the solvent. In addition, in the drying in the Embodiments C and D, in the case where the solvent remains in the electrolyte precursor, the solvent is also removed. However, different from the complexing agent constituting the electrolyte precursor, the solvent hardly constitutes the electrolyte precursor. In consequence, the content of the solvent which may remain in the electrolyte precursor is typically 3% by mass or less, preferably 2% by mass or less, and more preferably 1% by mass or less.

In the Embodiment C, in all other cases than the solvent, for example, the complexing agent, the mixing, the heating, the drying, the amorphous solid electrolyte, and the crystalline solid elements, and the like are the same as those described in the Embodiment A. In addition, in the Embodiment D, all other cases than the solvent are the same as those described in the Embodiment B.

In the Embodiments C and D, the matter that what the electrolyte precursor is pulverized is preferred, the pulverizer to be used for pulverization, the matter that after mixing or after drying, the pulverization may be performed, various conditions regarding pulverization, and so on are also the same as those in the Embodiment A.

The solid electrolyte which is obtained by the present production method of a solid electrolyte of the present embodiment has a high ionic conductivity and also has an excellent battery performance, and hardly generates hydrogen sulfide, so that it is suitably used for batteries. In the case of adopting a lithium element as the conduction species, such is especially suitable. The solid electrolyte of the present embodiment may be used for a positive electrode layer, may be used for a negative electrode layer, or may be used for an electrolyte layer. Each of the layers can be produced by a known method.

(Positive Electrode Mixture and Negative Electrode Mixture)

For example, in the case of using the solid electrolyte for the positive electrode layer or the negative electrode layer, by dispersing a positive electrode active material or a negative electrode active material in an electrolyte precursor-containing liquid or electrolyte precursor-containing slurry, each of which is the electrolyte precursor inclusion, mixing them, and drying, the electrolyte precursor is attached onto the active material surface. Furthermore, similar to the aforementioned embodiment, by heating the electrolyte precursor, it becomes an amorphous solid electrolyte or crystalline solid electrolyte. At this time, by heating together with the active material, the positive electrode mixture or negative electrode mixture having the solid electrolyte attached onto the active material surface is obtained.

As the positive electrode active material, any material can be used without particular restrictions so far as it may promote a battery chemical reaction accompanied by transfer of a lithium ion caused due to the lithium element to be preferably adopted as an element capable of revealing the ionic conductivity in the present embodiment in relation to the negative electrode active material. Examples of such a positive electrode active material in and from which a lithium ion can be inserted and released include an oxide-based positive electrode active material and a sulfide-based positive electrode active material.

Preferably, examples of the oxide-based positive electrode active material include lithium-containing transition metal complex oxides, such as LMO (lithium manganate), LCO (lithium cobaltate), NMC (lithium nickel manganese cobaltate), NCA (lithium nickel cobalt aluminate), LNCO (lithium nickel cobaltate), and an olivine type compound (LiMeNPO$_4$:Me=Fe, Co, Ni, or Mn).

Examples of the sulfide-based positive electrode active material include titanium sulfide (TiS$_2$), molybdenum sulfide (MoS$_2$), iron sulfide (FeS and FeS$_2$), copper sulfide (CuS), and nickel sulfide (Ni$_3$S$_2$).

Besides the aforementioned positive electrode active materials, niobium selenide (NbSe$_3$) and so on can also be used.

In the present embodiment, the positive electrode active material can be used alone or in combination of plural kinds thereof.

As the negative electrode active material, any material can be used without particular restrictions so long as it may promote a battery chemical reaction accompanied by transfer of a lithium ion caused preferably due to the lithium element, such as an element which is preferably adopted as an element revealing the ionic conductivity in the present embodiment, and preferably a metal capable of forming an alloy together with the lithium element, an oxide thereof, and an alloy of the foregoing metal and the lithium element. As such a negative electrode active material in and from which a lithium ion can be inserted and released, any material which is known as the negative electrode material in the battery field can be adopted without restrictions.

Examples of such a negative active material include metallic lithium or a metal capable of forming an alloy together with metallic lithium, such as metallic lithium, metallic indium, metallic aluminum, metallic silicon, and metallic tin; an oxide of such a metal; and an alloy of such a metal and metallic lithium.

The electrode active material which is used in the present embodiment may also be one having a coating layer whose surface is coated.

Examples of the material which forms the coating layer include ionic conductors, such as nitrides or oxides of an element revealing the ionic conductivity in the crystalline sulfide solid electrolyte to be used in the present embodiment, preferably a lithium element, or complexes thereof. Specifically, examples thereof include lithium nitride ($Li_3N$); a conductor having a lisicon type crystal structure composed of, as a main structure, $Li_4GeO_4$, for example, $Li_{4-2x}Zn_xGeO_4$; a conductor having an $Li_3PO_4$ type skeleton structure, for example, a thiolisicon type crystal structure, such as $Li_{4-x}Ge_{1-x}P_xS_4$; a conductor having a perovskite type crystal structure, such as $La_{2/3-x}Li_{3x}TiO_3$; and a conductor having an NASICON type crystal structure, such as $LiTi_2(PO_4)_3$.

In addition, examples thereof include lithium titanates, such as $Li_yTi_{3-y}O_4$ (0<y<3) and $Li_4Ti_5O_{12}$ (LTO); lithium metalates of a metal belonging to the Group 5 of the periodic table, such as $LiNbO_3$ and $LiTaO_3$; and oxide-based conductors, such as $Li_2O$—$B_2O_3$—$P_2O_5$-based, $Li_2O$—$B_2O_3$—ZnO-based, and $Li_2O$—$Al_2O_3$—$SiO_2$—$P_2O_5$—$TiO_2^-$ based materials.

The electrode active material having a coating layer is, for example, obtained by attaching a solution containing various elements constituting a material for forming the coating layer onto the surface of the electrode active material and burning the electrode active material after attachment preferably at 200° C. or higher and 400° C. or lower.

Here, as the solution containing various elements, a solution containing an alkoxide of a metal of every sort, such as lithium ethoxide, titanium isopropoxide, niobium isopropoxide, and tantalum isopropoxide, may be used. In this case, as the solvent, an alcohol-based solvent, such as ethanol and butanol; an aliphatic hydrocarbon solvent, such as hexane, heptane, and octane; an aromatic hydrocarbon solvent, such as benzene, toluene, and xylene; and so on may be used.

The aforementioned attachment may be performed through dipping, spray coating, or the like.

From the viewpoint of enhancing the production efficiency and the battery performance, a burning temperature is preferably 200° C. or higher and 400° C. or lower as mentioned above, and more preferably 250° C. or higher and 390° C. or lower, and a burning time is typically about 1 minute to 10 hours, and preferably 10 minutes to 4 hours.

A coverage of the coating layer on a basis of a surface area of the electrode active material is preferably 90% or more, more preferably 95% or more, and still more preferably 100%, namely it is preferred that the entire surface is coated. In addition, a thickness of the coating layer is preferably 1 nm or more, and more preferably 2 nm or more, and an upper limit thereof is preferably 30 nm or less, and more preferably 25 nm or less.

The thickness of the coating layer can be measured through cross-sectional observation with a transmission electron microscope (TEM), and the coverage can be calculated from the thickness, the elemental analysis value, and the BET surface area of the coating layer.

The aforementioned battery preferably uses a collector in addition to the positive electrode layer, the electrolyte layer, and the negative electrode layer, and the collector can be any known one. For example, a layer formed by coating Au, Pt, Al, Ti, Cu, or the like capable of reacting with the aforementioned solid electrolyte, with Au or the like can be used.

[Electrolyte Precursor]

The electrolyte precursor of the present embodiment is constituted of a lithium element, a sulfur element, a phosphorus element, a halogen element, and a complexing agent having at least two tertiary amino groups in the molecule. The electrolyte precursor of the present embodiment is the same as the electrolyte precursor described above in the production method of a solid electrolyte. In addition, the fact that the content of the complexing agent in the electrolyte precursor is preferably 10% by mass or more and 70% by mass or less is also the same as that in the electrolyte precursor described above in the production method of a solid electrolyte.

EXAMPLES

Next, the present invention is described specifically with reference to Examples, but it should be construed that the present invention is by no means restricted by these Examples.

Production Example 1

In a one-liter impeller-provided reaction tank, 15.3 g of lithium sulfide and 24.7 g of diphosphorus pentasulfide were added in a nitrogen atmosphere. After actuating the impeller, 400 mL of tetrahydrofuran which had been previously cooled to −20° C. was introduced into the container. After naturally raising the temperature to room temperature (23° C.), agitation was continued for 72 hours, the obtained reaction liquid slurry was charged in a glass filter (pore size: 40 to 100 μm) to obtain a solid component, and then, the solid component was dried at 90° C., thereby obtaining 38 g of $Li_3PS_4$ (purity: 90% by mass) as a white powder. The obtained powder was subjected to powder X-ray diffractometry (XRD) with an X-ray diffraction (XRD) apparatus (SmartLab apparatus, manufactured Rigaku Corporation). As a result, the foregoing powder expressed a hallow pattern and confirmed to be amorphous $Li_3PS_4$.

Production Example 2

The white powder of $Li_3PS_4$ obtained in Production Example 1 was dried in vacuo at 180° C. for 2 hours, thereby obtaining ß-$Li_3PS_4$ (crystalline).

Example 1

Into a stirring bar-containing Schlenk flask (capacity: 100 mL), 1.70 g of the white powder ($Li_3PS_4$: 1.53 g) obtained in Production Example 1, 0.19 g of lithium bromide, and 0.28 g of lithium iodide were introduced in a nitrogen atmosphere. After rotating the stirring bar, 20 mL of tetramethylethylenediamine (TMEDA) as a complexing agent was added, agitation was continued for 12 hours, and the obtained electrolyte precursor inclusion was dried in vacuo (at room temperature: 23° C.) to obtain an electrolyte precursor as a powder. Subsequently, the powder of the electrolyte precursor was heated at 120° C. in vacuo for 2 hours, thereby obtaining an amorphous solid electrolyte. Furthermore, the amorphous solid electrolyte was heated at 140° C. in vacuo for 2 hours, thereby obtaining a crystalline solid electrolyte (the heating temperature for obtaining a crystalline solid electrolyte (140° C. in this Example) will be sometimes referred to as "crystallization temperature").

A part of each of the obtained powder of the electrolyte precursor and crystalline solid electrolyte was dissolved in methanol, the obtained methanol solution was subjected to gas chromatographic analysis to measure the content of tetramethylethylenediamine. The results are shown in Table 2.

The obtained electrolyte precursor, amorphous solid electrolyte, and crystalline solid electrolyte were subjected to powder X-ray diffractometry (XRD) with an X-ray diffraction (XRD) apparatus (SmartLab apparatus, manufactured Rigaku Corporation), and X-ray diffraction spectra are shown in FIG. 3. In addition, the obtained amorphous solid electrolyte was subjected to composition analysis through ICP analysis (inductively coupled plasma atomic emission spectrophotometry). The results of the composition analysis are shown in Table 4.

In the X-ray diffraction spectrum of the electrolyte precursor, peaks different from the peaks derived from the used raw materials were observed, and an X-ray diffraction pattern different from those of the amorphous solid electrolyte and the crystalline solid electrolyte was shown. In addition, the raw materials used in this Example 1 (amorphous $Li_3PS_4$, lithium bromide, and lithium iodide) and the raw materials used in other Examples (lithium sulfide, diphosphorus pentasulfide, and crystalline $Li_3PS_4$) were also subjected to powder X-ray diffractometry (XRD), and X-ray diffraction spectra are shown in FIG. 4. The X-ray diffraction spectrum of the electrolyte precursor showed an X-ray diffraction pattern different from the X-ray diffraction spectra of the raw materials.

In the X-ray diffraction spectrum of the amorphous solid electrolyte, any peak other than the peaks derived from the raw materials was confirmed to be absent. In addition, in the X-ray diffraction spectrum of the crystalline solid electrolyte, crystallization peaks were detected mainly at $2\theta=20.2°$ and $23.6°$, and the crystalline solid electrolyte had a thio-LISICON Region II-type crystal structure. An ionic conductivity of the crystalline solid electrolyte was measured and found to be $2.90\times10^{-3}$ (S/cm), and the crystalline solid electrolyte was confirmed to have a high ionic conductivity.

In this Example, the measurement of the ionic conductivity was performed in the following manner.

From the obtained crystalline solid electrolyte, a circular pellet having a diameter of 10 mm (cross-sectional area S: $0.785\ cm^2$) and a height (L) of 0.1 to 0.3 cm was molded to prepare a sample. From the top and the bottom of the sample, electrode terminals were taken, and the ion conductivity was measured at 25° C. according to an alternate current impedance method (frequency range: 5 MHz to 0.5 Hz, amplitude: 10 mV) to give a Cole-Cole plot. In the vicinity of the right end of the arc observed in the high-frequency side region, a real number part $Z'$ ($\Omega$) at the point at which $-Z''$ ($\Omega$) is the smallest was referred to as a bulk resistance R ($\Omega$) of the electrolyte, and according to the following equation, the ion conductivity $\sigma$ (S/cm) was calculated.

$$R=\rho(L/S)$$

$$\sigma=1/\rho$$

Example 2

An electrolyte precursor, an amorphous solid electrolyte, and a crystalline solid electrolyte were obtained in the same manner as in Example 1, except that in Example 1, the complexing agent was changed to one shown in Table 1. With respect to the obtained crystalline solid electrolyte, the ionic conductivity was measured in the same manner as in Example 1. The results are shown in Table 1.

Example 3

An electrolyte precursor, an amorphous solid electrolyte, and a crystalline solid electrolyte were obtained in the same manner as in Example 1, except that in Example 1, the raw materials were changed to those shown in Table 1, and the agitation time was changed to 72 hours. With respect to the obtained crystalline solid electrolyte, the ionic conductivity was measured in the same manner as in Example 1. The results are shown in Table 1.

Example 4

An electrolyte precursor, an amorphous solid electrolyte, and a crystalline solid electrolyte were obtained in the same manner as in Example 1, except that in Example 1, the raw materials and the complexing agent were changed to those shown in Table 1, and the agitation time was changed to 72 hours. With respect to the obtained crystalline solid electrolyte, the ionic conductivity was measured in the same manner as in Example 1. The results are shown in Table 1.

Example 5

An electrolyte precursor, an amorphous solid electrolyte, and a crystalline solid electrolyte were obtained in the same manner as in Example 1, except that in Example 1, the use amount of the complexing agent was changed to 10 mL, 10 mL of heptane was used as the solvent, the agitation time was changed to 24 hours, and the crystallization temperature was changed to 160° C. With respect to the obtained crystalline solid electrolyte, the ionic conductivity was measured in the same manner as in Example 1. The results are shown in Table 1.

Example 6

An electrolyte precursor, an amorphous solid electrolyte, and a crystalline solid electrolyte were obtained in the same manner as in Example 1, except that in Example 1, the use amount of the complexing agent was changed to 4.4 mL, 15.6 mL of diethyl ether was used as the solvent, the agitation time was changed to 24 hours, and the crystallization temperature was changed to 160° C. With respect to the obtained crystalline solid electrolyte, the ionic conductivity was measured in the same manner as in Example 1. The results are shown in Table 1.

Example 7

An electrolyte precursor, an amorphous solid electrolyte, and a crystalline solid electrolyte were obtained in the same manner as in Example 1, except that in Example 1, the use amount of the complexing agent was changed to 4.4 mL, 15.6 mL of diisopropyl ether was used as the solvent, the agitation time was changed to 24 hours, and the crystallization temperature was changed to 180° C. With respect to the obtained crystalline solid electrolyte, the ionic conductivity was measured in the same manner as in Example 1. The results are shown in Table 1.

Example 8

An electrolyte precursor, an amorphous solid electrolyte, and a crystalline solid electrolyte were obtained in the same manner as in Example 1, except that in Example 1, the use amount of the complexing agent was changed to 4.4 mL, 15.6 mL of dibutyl ether was used as the solvent, the agitation time was changed to 24 hours, and the crystallization temperature was changed to 180° C. With respect to the obtained crystalline solid electrolyte, the ionic conductivity was measured in the same manner as in Example 1. The results are shown in Table 1.

The content of tetramethylethylenediamine in each of the powdered electrolyte precursor and crystalline solid electrolyte obtain in Example 8 was measured in the same manner as in Example 1. The results are shown in Table 2. In addition, with respect to the amorphous solid electrolyte obtained in Example 8, the composition analysis was performed in the same manner as in Example 1. The results are shown in Table 4.

With respect to the amorphous solid electrolyte and the crystalline solid electrolyte obtained in Example 8, the solid $^{31}$P-NMR spectrometry was performed. The solid $^{31}$P-NMR spectrometry was performed in the following manner.

Peak Intensity

About 60 mg of a powdered sample was charged in an NMR test tube, and a solid $^{31}$P-NMR spectrum was obtained using the following apparatus under the following condition.

Apparatus: ECZ400R (manufactured by JEOL Ltd.)
Observation nucleus: $^{31}$P
Observation frequency: 161.944 MHz
Measurement temperature: Room temperature
Pulse sequence: Single pulse (using 90° pulse)
90° pulse width: 3.8μ
Wait time until the next pulse application after FID measurement: 300 seconds
Magic angle rotation speed: 12 kHz
Accumulation count: 16 times
Measurement range: 250 ppm to 150 ppm
Chemical shift: The chemical shift was obtained using $(NH_4)_2HPO_4$ (chemical shift: 1.33 ppm) as an external reference.

A height from a baseline of each of peaks observed in the obtained solid $^{31}$P-NMR spectrum was designated as the peak intensity.

Peak Resolution

In the case of performing the peak resolution, the obtained solid $^{31}$P-NMR spectrum is analyzed with a software "FT-NMR" (a software recorded "Data Processing of FT-NMR by Personal Computer" Revised Edition (Second Edition) (published by Sankyo Publishing Co., Ltd.), to determine resolved peaks.

According to the aforementioned software, separation peaks, calculated values of NMR signals (observed values), and residual square sums R2 are calculated from the NMR signals by means of the nonlinear least-squares method. In the case where when a maximum peak height is designated as 1, the residual square sum R2 within an analysis range between the observed value and the calculated value becomes 0.007 or less, and the number of resolved peaks becomes minimum, it is considered that the peak resolution is completed. The results are shown in Tables 5 and 6 and FIGS. 8 and 9.

Example 9

An electrolyte precursor, an amorphous solid electrolyte, and a crystalline solid electrolyte were obtained in the same manner as in Example 1, except that in Example 1, the complexing agent was changed to 5.0 mL of tetramethykliaminopropane, 15.0 mL of dibutyl ether was used as the solvent, the agitation time was changed to 24 hours, and the crystallization temperature was changed to 180° C. With respect to the obtained crystalline solid electrolyte, the ionic conductivity was measured in the same manner as in Example 1. The results are shown in Table 1.

Example 10

An electrolyte precursor, an amorphous solid electrolyte, and a crystalline solid electrolyte were obtained in the same manner as in Example 1, except that in Example 1, the raw materials were changed to those shown in Table 1, the complexing agent was changed to 4.4 mL of tetramethylethylenediamine, 15.6 mL of cyclohexane was used as the solvent, the agitation time was changed to 72 hours, and the crystallization temperature was changed to 180° C. With respect to the obtained crystalline solid electrolyte, the ionic conductivity was measured in the same manner as in Example 1. The results are shown in Table 1.

Example 11

An electrolyte precursor, an amorphous solid electrolyte, and a crystalline solid electrolyte were obtained in the same manner as in Example 1, except that in Example 1, the raw materials were changed to those shown in Table 1, the complexing agent was changed to 4.4 mL of tetramethylethylenediamine, 15.6 mL of dibutyl ether was used as the solvent, the agitation time was changed to 72 hours, and the crystallization temperature was changed to 180° C. With respect to the obtained crystalline solid electrolyte, the ionic conductivity was measured in the same manner as in Example 1. The results are shown in Table 1.

Example 12

An electrolyte precursor, an amorphous solid electrolyte, and a crystalline solid electrolyte were obtained in the same manner as in Example 1, except that in Example 1, the raw materials were changed to those shown in Table 1. With respect to the obtained crystalline solid electrolyte, the ionic conductivity was measured in the same manner as in Example 1. The results are shown in Table 1.

Example 13

An electrolyte precursor, an amorphous solid electrolyte, and a crystalline solid electrolyte were obtained in the same manner as in Example 1, except that in Example 1, the raw materials were changed to those shown in Table 1. With respect to the obtained crystalline solid electrolyte, the ionic conductivity was measured in the same manner as in Example 1. The results are shown in Table 1.

Comparative Examples 1 to 8

Electrolyte precursors, amorphous solid electrolytes, and crystalline solid electrolytes of Comparative Examples 1, 2, 4, and 6 to 8 were obtained in the same manner as in Example 1, except that in Example 1, the solvent shown in Table 1 was used as the complexing agent. In addition, an electrolyte precursor, an amorphous solid electrolyte, and a crystalline solid electrolyte of Comparative Example 3 were obtained in the same manner as in Example 13, except that in Example 13, dimethoxyethane was used. An electrolyte precursor, an amorphous solid electrolyte, and a crystalline solid electrolyte of Comparative Example 5 were obtained in the same manner as in Example 3, except that in Example 3, tetraethylamine was used.

With respect to the crystalline solid electrolytes obtained in Comparative Examples 1 to 8, the ionic conductivity was measured in the same manner as in Example 1. The results are shown in Table 1. In the powder X-ray diffractometry of the crystalline solid electrolytes obtained in Examples 1 to 13, all of the samples had a thio-LISICON Region II-type crystal structure, and crystalline $Li_3PS_4$ (ß-$Li_3PS_4$) was not observed. On the other hand, in Comparative Examples 1 to 8, all of the samples did not have a thio-LISICON Region II-type crystal structure, and crystalline $Li_3PS_4$ was observed as the main crystal.

TEA: Triethylamine
Pyr: Pyridine
EDA: Ethylenediamine
NBA: n-Butylamine

TABLE 2

|  |  | Content in electrolyte precursor | | Content in crystalline solid electrolyte | |
|---|---|---|---|---|---|
|  |  | Complexing agent % by mass | Solvent % by mass | Complexing agent % by mass | Solvent % by mass |
| Example | 1 | 55.0 | — | 1.2 | — |
|  | 8 | 53.0 | 0.5 | 0.3 | Not detected |

TABLE 1

|  |  |  | Raw material | | | | | | Complexing agent and solvent | | Ionic |
|---|---|---|---|---|---|---|---|---|---|---|---|
|  |  | Embodiment | $Li_2S$ (g) | $P_2S_5$ (g) | $Li_3PS_4$ (g) | β-$Li_3PS_4$ (g) | LiBr (g) | LiI (g) | Complexing agent Kind | Solvent Kind | conductivity (mS/cm) |
| Example | 1 | B | — | — | 1.70 | — | 0.19 | 0.28 | TMEDA | — | 2.9 |
|  | 2 | B | — | — | 1.70 | — | 0.19 | 0.28 | TMPDA | — | 2.4 |
|  | 3 | A | 0.59 | 0.95 | — | — | 0.19 | 0.28 | TMEDA | — | 1.7 |
|  | 4 | A | 0.59 | 0.95 | — | — | 0.19 | 0.28 | TMPDA | — | 1.9 |
|  | 5 | D | — | — | 1.70 | — | 0.19 | 0.28 | TMEDA | Hep | 3.1 |
|  | 6 | D | — | — | 1.70 | — | 0.19 | 0.28 | TMEDA | DEE | 3.1 |
|  | 7 | D | — | — | 1.70 | — | 0.19 | 0.28 | TMEDA | DIPE | 3.7 |
|  | 8 | D | — | — | 1.70 | — | 0.19 | 0.28 | TMEDA | DBE | 4.3 |
|  | 9 | D | — | — | 1.70 | — | 0.19 | 0.28 | TMPDA | DBE | 3.7 |
|  | 10 | C | 0.59 | 0.95 | — | — | 0.19 | 0.28 | TMEDA | c-Hex | 3.3 |
|  | 11 | C | 0.59 | 0.95 | — | — | 0.19 | 0.28 | TMEDA | DBE | 2.8 |
|  | 12 | B | — | — | — | 1.53 | 0.19 | 0.28 | TMEDA | — | 1.1 |
|  | 13 | B | — | — | 1.62 | — | — | 0.54 | TMEDA | — | 1.7 |
| Comparative Example | 1 | B | — | — | 1.70 | — | 0.19 | 0.28 | DME | — | 0.4 |
|  | 2 | B | — | — | 1.70 | — | 0.19 | 0.28 | THF | — | 0.8 |
|  | 3 | B | — | — | 1.62 | — | — | 0.54 | DME | — | 0.5 |
|  | 4 | B | — | — | 1.70 | — | 0.19 | 0.28 | DBE | — | 0.2 |
|  | 5 | A | 0.59 | 0.95 | — | — | 0.19 | 0.28 | TEA | — | 0.2 |
|  | 6 | B | — | — | 1.70 | — | 0.19 | 0.28 | Pyr | — | 0.3 |
|  | 7 | B | — | — | 1.70 | — | 0.19 | 0.28 | EDA | — | 0.1 |
|  | 8 | B | — | — | 1.70 | — | 0.19 | 0.28 | NBA | — | 0.1 |

The raw materials used in the present Examples are as follows.
$Li_2S$: Lithium sulfide
$P_2S_5$: Diphosphorus pentasulfide
$Li_3PS_4$: Amorphous $Li_3PS_4$ obtained in Production Example 1
ß-$Li_3PS_4$: Crystalline $Li_3PS_4$ obtained in Production Example 2
LiBr: Lithium bromide
LiI: Lithium iodide The complexing agents and solvents described in Table 1, which were used in the present Examples, are as follows.
TMEDA: Tetramethylethylenediamine (N,N,N',N'-tetramethylethylenediamine)
TMPDA: Tetramethyldiaminopropane (N,N,N',N'-tetramethyl-1,3-diaminopropane)
Hep: Heptane
DEE: Diethyl ether
DIPS: Diisopropyl ether
DBE: Dibutyl ether
c-Hex: Cyclohexane
DME: Dimethoxyethane
THF: Tetrahydrofuran From the results of the aforementioned Examples (results shown in Table 1), it was conformed that according to the production method of a solid electrolyte of the present embodiment, by merely mixing the raw material inclusion and the predetermined complexing agent, a solid electrolyte having a high ionic conductivity is obtained. It was confirmed that by using, as the complexing agent, a material containing a compound having at least two tertiary amino groups (amine compound) in the molecule and using a combination of the foregoing amine compound and a specified solvent (i.e., an ether-based solvent, an aliphatic hydrocarbon solvent, or an alicyclic hydrocarbon solvent), the ionic conductivity tends to be enhanced. On the other hand, it was confirmed that though Comparative Examples 1 to 4 and 6 to 8 not using the complexing agent containing a compound having at least two tertiary amino groups in the molecule can be directly compared with Example 1, and Comparative Example 5 can be directly compared with Example 3, in all of the Comparative Examples, the ionic conductivity is remarkably lowered as compared with the Examples. In addition, while according to the production method of the present embodiment, an amorphous solid electrolyte can be produced, the production method of the present embodiment is preferably used for the production of a crystalline solid electrolyte from the viewpoint of maximally utilizing its characteristics.

From the results of Table 2, in the electrolyte precursor of Example 1, the complexing agent is contained in an amount of about 55.0% by mass, and besides, the elements caused due to the used raw materials are contained; however, from the X-ray diffraction spectra of FIGS. 3 and 4, it may be considered that the raw materials themselves are not contained, but they are contained as a co-crystal constituted of the complexing agent, the lithium element, and the like. In addition, though in the electrolyte precursor of Example 8, the solvent (dibutyl ether) is slightly contained, it may be considered that similar to the electrolyte precursor of Example 1, a co-crystal constituted of the complexing agent, the lithium element, and the like is contained.

Example 14

An electrolyte precursor inclusion obtained in the same manner as in Example 1 was charged in a glass filter (pore size: 40 to 100 μm) and subjected to solid-liquid separation, to obtain an electrolyte precursor as a solid component. The obtained electrolyte precursor was heated in vacuo at 120° C. for 2 hours, to obtain an amorphous solid electrolyte. Furthermore, the amorphous solid electrolyte was heated in vacuo at 140° C. for 2 hours, to obtain a crystalline solid electrolyte.

The obtained amorphous solid electrolyte was subjected to composition analysis through ICP analysis (inductively coupled plasma atomic emission spectrophotometry). The composition analysis results are shown in Table 4. In addition, the obtained crystalline solid electrolyte was subjected to powder X-ray diffractometry (XRD) in the same manner as in Example 1. As a result, the crystalline solid electrolyte had a thio-LISICON Region II-type crystal structure. As a result of the measurement of ionic conductivity, the foregoing crystalline solid electrolyte had an ionic conductivity of $2.60 \times 10^{-3}$ (S/cm) and was confirmed to have a high ionic conductivity (see Table 3).

Example 15

An electrolyte precursor inclusion obtained in the same manner as in Example 8 was charged in a glass filter (pore size: 40 to 100 μm) and subjected to solid-liquid separation, to obtain an electrolyte precursor as a solid component. The obtained electrolyte precursor was heated in vacuo at 120° C. for 2 hours, to obtain an amorphous solid electrolyte. Furthermore, the amorphous solid electrolyte was heated in vacuo at 180° C. for 2 hours, to obtain a crystalline solid electrolyte.

The obtained amorphous solid electrolyte was subjected to composition analysis through ICP analysis (inductively coupled plasma atomic emission spectrophotometry). The composition analysis results are shown in Table 4. In addition, the obtained crystalline solid electrolyte was subjected to powder X-ray diffractometry (XRD) in the same manner as in Example 1. As a result, the crystalline solid electrolyte had a thio-LISICON Region II-type crystal structure. As a result of the measurement of ionic conductivity, the foregoing crystalline solid electrolyte had an ionic conductivity of $3.40 \times 10^{-3}$ (S/cm) and was confirmed to have a high ionic conductivity (see Table 3).

Comparative Examples 9 and 10

Electrolyte precursors, amorphous solid electrolytes, and crystalline solid electrolytes were obtained in the same manner as in Example 14, except that in Example 14, the complexing agent was changed to one shown in Table 3.

The obtained amorphous solid electrolytes were subjected to composition analysis through ICP analysis (inductively coupled plasma atomic emission spectrophotometry). The composition analysis results are shown in Table 4. In addition, the obtained crystalline solid electrolytes were subjected to powder X-ray diffractometry (XRD) in the same manner as in Example 1. As a result, in the crystalline solid electrolytes, a thio-LISICON Region II-type crystal structure was not seen, and the crystalline $Li_3PS_4$ was a main crystal. The measurement results of the ionic conductivity are shown in Table 3.

With respect to Comparative Examples 1 and 2, the obtained amorphous solid electrolytes were subjected to composition analysis through ICP analysis (inductively coupled plasma atomic emission spectrophotometry). The composition analysis results are shown in Table 4.

TABLE 3

| | | | Raw material | | | | | Complexing agent and solvent | | Ionic |
| | | | | | | | | Complexing | | |
| | | Embodiment | $Li_2S$ (g) | $P_2S_5$ (g) | $Li_3PS_4$ (g) | $β-Li_3PS_4$ (g) | LiBr (g) | LiI (g) | agent Kind | Solvent Kind | conductivity (mS/cm) |
|---|---|---|---|---|---|---|---|---|---|---|---|
| Example | 14 | B | — | — | 1.70 | — | 0.19 | 0.28 | TMEDA | — | 2.6 |
| | 15 | D | — | — | 1.70 | — | 0.19 | 0.28 | TMEDA | DBE | 3.4 |
| Comparative Example | 9 | B | — | — | 1.70 | — | 0.19 | 0.28 | DME | — | 0.2 |
| | 10 | B | — | — | 1.70 | — | 0.19 | 0.28 | THF | — | 0.2 |

TABLE 4

| | | Li % by mass | P % by mass | S % by mass | Br % by mass | I % by mass |
|---|---|---|---|---|---|---|
| Example | 1 | 10.1 | 13.2 | 55.2 | 8.4 | 13.1 |
| | 8 | 10.4 | 12.9 | 55.1 | 8.7 | 12.8 |
| | 14 | 10.8 | 13.9 | 56.6 | 3.8 | 14.9 |
| | 15 | 10.4 | 13.2 | 56.2 | 7.6 | 12.7 |
| Comparative Example | 1 | 10.2 | 12.8 | 54.4 | 8.8 | 13.7 |
| | 2 | 10.0 | 12.4 | 54.3 | 9.2 | 14.1 |
| | 9 | 11.6 | 16.9 | 69.7 | 0.6 | 1.2 |
| | 10 | 11.9 | 17.3 | 70.6 | 0.0 | 0.2 |

From Tables 1 and 3, it could not be said that all of the solid electrolytes of the Comparative Examples not using a material containing, as the complexing agent, the compound having at least two tertiary amino groups in the molecule (amine compound) have a high ionic conductivity.

In the case of not using a complexing agent containing an amine compound, with respect to the lowering of the ionic conductivity of the obtained solid electrolyte, the composition analysis shown in Table 3 reveals that in Comparative Examples 9 and 10 in which the co-crystal was obtained through solid-liquid separation, the contents of the bromine element and the iodine element are extremely low. It may be assumed that this was caused due to the fact that since the complexing agent containing an amine compound was not used, the halogen elements were not incorporated into the co-crystal but flew out through dissolution into the solvent, or the like during the solid-liquid separation.

In addition, in Comparative Examples 1 and 2 in which the co-crystal was obtained through drying but not solid-liquid separation, the flowing out of the halogen elements through solid-liquid separation did not take place, and thus, the contents of the halogen elements were detected largely. But, since the amine compound was not used, the halogen elements were not incorporated into the crystal structure similar to Comparative Examples 9 and 10, and even by obtaining the crystalline solid electrolytes by heating, the halogen elements did not function in the crystal structure, and thus, it may be assumed that as a result, a high ionic conductivity was not obtained.

From the results of Table 3, in comparison between Examples 1 and 14 as well as between Examples 8 and 15, in which the both are different from each other from the standpoint of whether or not the solid-liquid separation is performed, when the solid-liquid separation was performed, a tendency of lowering in the ionic conductivity was revealed. As shown in Table 4, by performing the solid-liquid separation as in Example 14, it may be conjectured that the halogen elements flew out, resulting in influencing the lowering of the ionic conductivity. From the results of Table 3, with respect to Comparative Examples 9 and 10 not using the complexing agent containing an amine compound, it may be conjectured that when performing the solid-liquid separation, the flowing out of the halogen elements became extremely remarkable, and as a result, the ionic conductivity became extremely low.

In addition, from the results of Table 4, with respect to Comparative Examples 1 and 2, since the flowing out of the halogen elements due to the solid-liquid separation did not take place, while large quantities of the halogen elements are detected, the ionic conductivity of the obtained crystalline solid electrolytes becomes low. From these results, it is noted that in the case of not using a material containing a compound having at least two tertiary amino groups in the molecule (amine compound) as the complexing agent, even when the halogen elements exist in the crystalline solid electrolyte, a high ionic conductivity is not obtained. This is caused due to the fact that since the amine compound was not used as the complexing agent, the halogen elements were hardly incorporated into the crystal structure, and the halogen elements did not function in the crystal structure, and thus, it may be considered that as a result, a high ionic conductivity was not obtained.

(Exposure Test)

Figure 5:
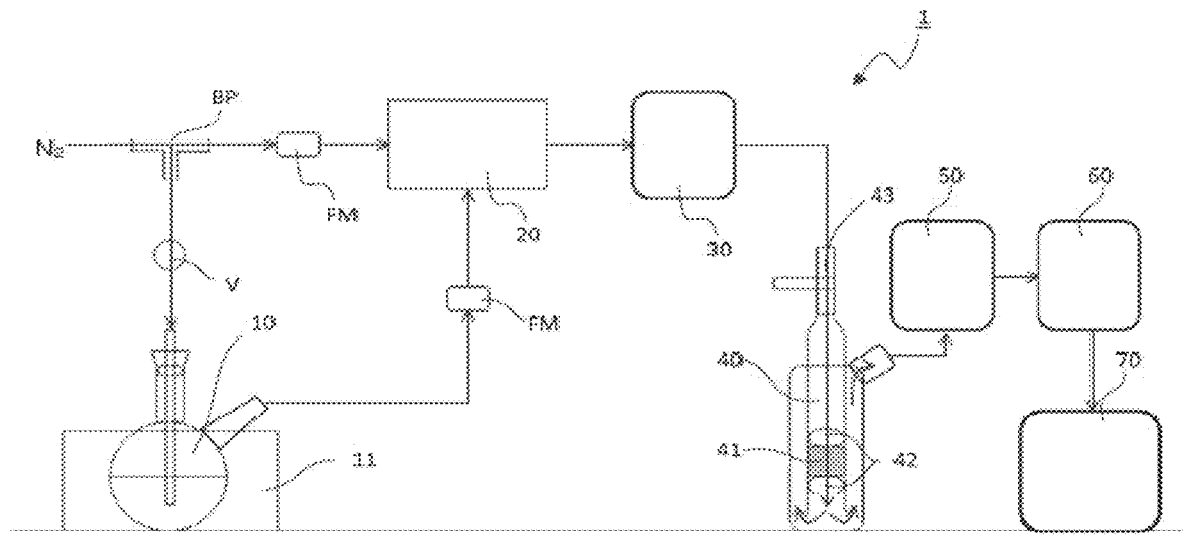
FIG. 5 is a diagrammatic configuration diagram of a test apparatus used in an exposure test.

First of all, a testing apparatus to be used for the exposure test (exposure testing apparatus 1) is explained by reference to FIG. 5.

The exposure testing apparatus 1 includes, as main structural elements, a flask 10 for humidifying nitrogen; a static mixer 20 for mixing humidified nitrogen and non-humidified nitrogen; a dew point meter 30 for measuring the moisture of mixed nitrogen (M170/DMT152, manufactured by VAISALA KK); a dual reaction pipe 40 for installing a measuring sample; a dew point meter 50 for measuring the moisture of nitrogen discharged from the dual reaction pipe 40; and a hydrogen sulfide measurement analyzer 60 for measuring the concentration of hydrogen sulfide contained in discharged nitrogen (Model 3000RS, manufactured by AMI), and these are connected with each other using tubes (not illustrated). A temperature of the flask 10 is set to 10° C. by a cooling tank 11.

For the tubes for connecting the respective structural elements, a Teflon (registered trademark) tube having a diameter of 6 mm was used. In this figure, expressions of the tubes are omitted, and instead thereof, the flows are expressed using arrows.

The procedures of evaluation are as follows.

In a nitrogen glow box set to a dew point of −80° C., about 1.5 g of a powdered sample 41 was weighed and installed in the inside of the reaction pipe 40 such that it was sandwiched by quartz wools 42, followed by hermetically sealing. The evaluation was performed at room temperature (20° C.).

Nitrogen was fed at 0.02 MPa into the apparatus 1 from a nitrogen source (not illustrated). The fed nitrogen passes through a bifurcation pipe BP, and a part thereof is fed into the flask 10 and humidified. The other is fed as non-humidified nitrogen directly into the static mixer 20. The feed amount of nitrogen into the flask 10 is adjusted by a needle valve V.

By adjusting a flow rate of each of the non-humidified nitrogen and the humidified nitrogen by a needle valve-provided flow meter FM, the dew point is controlled. Specifically, into the static mixer 20, the non-humidified nitrogen was fed at a flow rate of 800 mL/min, whereas the humidified nitrogen was fed at a flow rate of 10 to 30 mL/min. The both were mixed, and a dew point of the mixed gas (a mixture of the humidified nitrogen and the humidified nitrogen) was confirmed with the dew point meter 30.

After adjusting the dew point to a temperature shown in Table 1, a three-way cock 43 was rotated, and the mixed gas was passed through the inside of the reaction pipe 40 for a time shown in Table 1. The amount of hydrogen sulfide contained in the mixed gas having passed through the sample 41 was measured with the hydrogen sulfide measurement analyzer 60. The amount of hydrogen sulfide was recorded at 15 minute intervals. In addition, for reference, a dew point of the mixed gas after exposure was measured with the clew point meter 50.

In order to remove hydrogen sulfide from the nitrogen after measurement, the resulting mixed gas was passed through an alkali trap 70.

With respect to the crystalline solid electrolyte obtained in Example 8, the amorphous $Li_3PS_4$ obtained in Production Example 1, and the crystalline solid electrolytes obtained in the following Reference Examples 1 and 2, an exposure test was performed according to the aforementioned exposure test method. A graph expressing a change with time of generation amount of hydrogen sulfide at an exposure time as measured at all times is shown in FIG. 6, and a graph expressing a change with time of cumulative generation amount of hydrogen sulfide at an exposure time is shown in FIG. 7.

Reference Example 1

Using "BEAD MILL LMZ015" (manufactured by Ashizawa Finetech Ltd.) as a bead mill, 485 g of a zirconia ball having a diameter of 0.5 mm was charged. A 2.0-liter agitator-provided glass-made reactor was used as a reaction tank.

29.66 g of lithium sulfide, 47.83 g of diphosphorus pentasulfide, 14.95 g of lithium bromide, 15.36 g of lithium iodide, and 1,200 mL of dehydrated toluene were charged in the reaction tank, to prepare a slurry. The slurry charged in the reaction tank was circulated at a flow rate of 600 mL/min by using a pump within the bead mill apparatus; an operation of the bead mill was commenced at a circumferential velocity of 10 m/s; the circumferential velocity of the bead mill was changed to 12 m/s; hot water (HW) was passed therethrough by means of external circulation; and reaction was performed such that an ejection temperature of the pump was kept at 70° C. After removing a supernatant of the obtained slurry, the residue was placed on a hot plate and dried at 80° C., thereby obtaining a powdered amorphous solid electrolyte. The obtained powdered amorphous solid electrolyte was heated at 195° C. for 3 hours by using a hot plate installed within a globe box, thereby obtaining a crystalline solid electrolyte. The obtained crystalline solid electrolyte was subjected to powder X-ray diffractometry (XRD). As a result, crystallization peaks were detected at 2θ=19.9° and 23.6°.

Reference Example 2

Using "BEAD MILL LMZ015" (manufactured by Ashizawa Finetech Ltd.) as a bead mill, 485 g of a zirconia ball having a diameter of 0.5 mm was charged. A 2.0-liter agitator-provided glass-made reactor was used as a reaction tank.

34.77 g of lithium sulfide and 45.87 g of diphosphorus pentasulfide were charged in the reaction tank, and 1,000 mL of dehydrated toluene was further added to prepare a slurry. The slurry charged in the reaction tank was circulated at a flow rate of 600 mL/min by using a pump within the bead mill apparatus; an operation of the bead mill was commenced at a circumferential velocity of 10 m/s; and then, 13.97 g of iodine (manufactured by Wako Pure Chemical Industries, Ltd., Special Grade) and 13.19 g of bromine (manufactured by Wako Pure Chemical Industries, Ltd., Special Grade) dissolved in 200 mL of dehydrated toluene were charged in the reaction tank.

After completion of charging of iodine and bromine, the circumferential velocity of the bead mill was changed to 12 m/s; hot water (HW) was passed therethrough by means of external circulation; and reaction was performed such that an ejection temperature of the pump was kept at 70° C. After removing a supernatant of the obtained slurry, the residue was placed on a hot plate and dried at 80° C., thereby obtaining a powdered amorphous solid electrolyte. The obtained powdered amorphous solid electrolyte was heated at 195° C. for 3 hours by using a hot plate installed within a globe box, thereby obtaining a crystalline solid electrolyte. The obtained crystalline solid electrolyte was subjected to powder X-ray diffractometry (XRD). As a result, crystallization peaks were detected at 2θ=19.9° and 23.6°. In addition, with respect to the amorphous solid electrolyte and the crystalline solid electrolyte obtained in Reference Example 2, the solid $^{31}$P-NMR spectrometry was performed. The results are shown in Tables 5 and 6 and FIGS. 8 and 9.

TABLE 5

| Assignment (peak position) | Example 8 (after heating at 120° C.) Pmol % | Reference Example 2 (after drying at 80° C.) Pmol % |
|---|---|---|
| $PS_4^{3-}$ (amorphous) (83 to 85 ppm) | 91.2 | 84.6 |
| $P_2S_6^{4-}$ (amorphous) (106 to 108 ppm) | Not detected | 11.3 |

TABLE 5-continued

| Assignment (peak position) | Example 8 (after heating at 120° C.) Pmol % | Reference Example 2 (after drying at 80° C.) Pmol % |
|---|---|---|
| $P_2S_7^{4-}$ (amorphous) (90 to 92 ppm) | Not detected | 4.1 |
| Unclear (92.5 ppm) | 8.8 | Not detected |

TABLE 6

| Assignment (peak position) | Example 8 (after heating at 120° C.) Pmol % | Reference Example 2 (after drying at 80° C.) Pmol % |
|---|---|---|
| R-II (1) (92 to 94 ppm) | 32.9 | — |
| R-II (2) (88 to 90 ppm) | 26 | 54.3 |
| R-II (3) (76 to 78 ppm) | 23.3 | 22.7 |
| R-III (96 to 98 ppm) | 2.3 | 1.9 |
| Low ionic conductive crystal (83.5 to 84.5 ppm) | — | 15.8 |
| $PS_4^{3-}$ (amorphous) (83 to 85 ppm) | 10.9 | — |
| $P_2S_6^{4-}$ (amorphous) (106 to 108 ppm) | — | 5.3 |
| Unclear (73 to 74 ppm) | 4.6 | — |

It was confirmed that in the amorphous $Li_3PS_4$ obtained in Example 1, the crystalline solid electrolyte obtained in Reference Example 1 by the conventional solid-phase method (mechanical milling method), and the crystalline solid electrode obtained in Reference Example 2 using the halogen simple substance as the raw material, hydrogen sulfide was generated in an amount of 7 ppm at maximum, and the cumulative generation amount after lapsing 120 minutes is more than 1 cc/g, whereas in the solid electrolyte obtained in Example 11 which is concerned with the production method of the present embodiment, the hydrogen sulfide is not substantially generated.

With respect to the solid $^{31}$P-NMR spectra of the amorphous solid electrolytes of Example 8 and Reference Example 2, the peak resolution was performed. As a result, as described in Table 5, peaks assigned to the $PS_4^{3-}$ structure, the $P_2S_7^{4-}$ structure, and the $P_2S_6^{4-}$ structure ($P_xS_y^{a-}$ structure) and the unclear peak were detected in a range of 60 ppm to 130 ppm. The area of each of the peaks was defined as a1, a2, a3, and a4, respectively, and the sum total of the areas of these peaks (=a1+a2+a3+a4) was defined as $S_a$. In the phosphorus contained in the amorphous solid electrolyte, the ratio of phosphorus (phosphorus ratio, mol %) contained in each of the $PS_4^{3-}$ structure, the $P_2S_6^{4-}$ structure, the $P_2S_7^{4-}$ structure, and the unclear peak (92.5 ppm) was determined according to the following expressions.

Phosphorus ratio of $PS_4^{3-}=100 \times a1/S_a$
Phosphorus ratio of $P_2S_6^{4-}=100 \times a2/S_a$
Phosphorus ratio of $P_2S_7^{4-}=100 \times a3/S_a$
Phosphorus ratio of unclear peak (92.5 ppm)$=100 \times a4/S_a$ The peak assigned to the glass that is an amorphous solid electrolyte, as obtained from Example 8 was only the $PS_4^{3-}$ structure, whereas in the amorphous solid electrolyte obtained from Reference Example 2, in addition to the $PS_4^{3-}$ structure, the $P_2S_6^{4-}$ structure, the $P_2S_7^{4-}$ structure were also observed.

In the solid $^{31}$P-NMR spectrometry of the crystalline solid electrolyte, as described in Table 6, the peaks assigned to the thio-LISICON Region II (R-II) (1) to (3), the thio-LISICON Region III (R-III), the low ionic conductive crystal, the $PS_4^{3-}$ structure (glass), the $P_2S_6^{4-}$ structure (glass), and the unclear peak (73 to 74 ppm) were detected. The area of each of the peaks was defined as b1, b2, b3, b4, b5, b6, b7, and b8, respectively, and the sum total of the areas of these peaks (=b1+b2+b3+b4+b5+b6+b7+b8) was defined as $S_b$. In the phosphorus contained in the crystalline solid electrolyte, the ratio of phosphorus (phosphorus ratio, mol %) contained in each of the thio-LISICON Region II (R-II) (1) to (3), the thio-LISICON Region III (R-III), the low ionic conductive crystal, the $PS_4^{3-}$ structure (glass), the $P_2S_6^{4-}$ structure (glass), and the unclear peak (73 to 74 ppm) was determined according to the following expressions. Further, the thio-LISICON Region II (R-II) (1) to (3) are different from each other in the dispersion state of a sulfur atom and a halogen atom (Cl, Br) around $PS_4^{3-}$ in the crystal of the thio-LISICON Region II.

Phosphorus ratio of thio-LISICON Region II (R-II) (1)=100×b1/$S_b$

Phosphorus ratio of thio-LISICON Region II (R-II) (2)=100×b2/$S_b$

Phosphorus ratio of thio-LISICON Region II (R-II) (3)=100×b3/$S_b$

Phosphorus ratio of thio-LISICON Region III (R-III)=100×b4/$S_b$

Phosphorus ratio of low ionic conductive crystal=100×b5/$S_b$

Phosphorus ratio of $PS_4^{3-}$=100×b6/$S_b$

Phosphorus ratio of $P_2S_6^{4-}$=100×b7/$S_b$

Phosphorus ratio of unclear peak (73 to 74 ppm)=100×b8/$S_b$

In the crystalline solid electrolyte of Reference Example 2, the $P_2S_6^{4-}$ structure (amorphous) was observed, whereas in the crystalline solid electrolyte of Example 8, the $P_2S_6^{4-}$ structure (amorphous) was not observed, and the $PS_4^{3-}$ structure (amorphous) was observed.

Example 16

Into a one-liter impeller-provided reaction tank, 25.5 g of the white powder ($Li_3PS_4$: 22.9 g) obtained in Production Example 1, 2.8 g of lithium bromide, and 4.3 g of lithium iodide were introduced in a nitrogen atmosphere. After rotating the impeller, 544 mL of dibutyl ether (DBE) as a solvent and 66.5 mL of tetramethylethylenediamine (TMEDA) as a complexing agent were charged, and agitation was continued for 24 hours, thereby obtaining an electrolyte precursor inclusion. A part of the obtained electrolyte precursor inclusion was subjected to pulverization treatment while circulating by using a circulation-operable bead mill ("STAR MILL LMZ015 (a trade name)", manufactured by Ashizawa Finetech Ltd.) for 15 minutes under a predetermined condition (bead diameter: 0.5 mmφ, use amount of bead: 456 g (bead filling ratio relative to the pulverization chamber: 80%), pump flow rate: 550 mL/min, circumferential velocity: 8 m/s, mill jacket temperature: 20° C.). The pulverization pass number required for the pulverization treatment was 14 passes.

Subsequently, the pulverized electrolyte precursor inclusion containing the electrolyte precursor inclusion having been subjected to pulverization treatment was dried in vacuo at room temperature (23° C.), thereby obtaining a powder of the pulverized electrolyte precursor. The powder of the pulverized electrolyte precursor was heated in vacuo at 130° C. for 2 hours, to obtain a crystalline solid electrolyte (the heating temperature (130° C. in this Example) for obtaining the crystalline solid electrolyte is sometimes referred to as "crystallization temperature").

Figure 10:
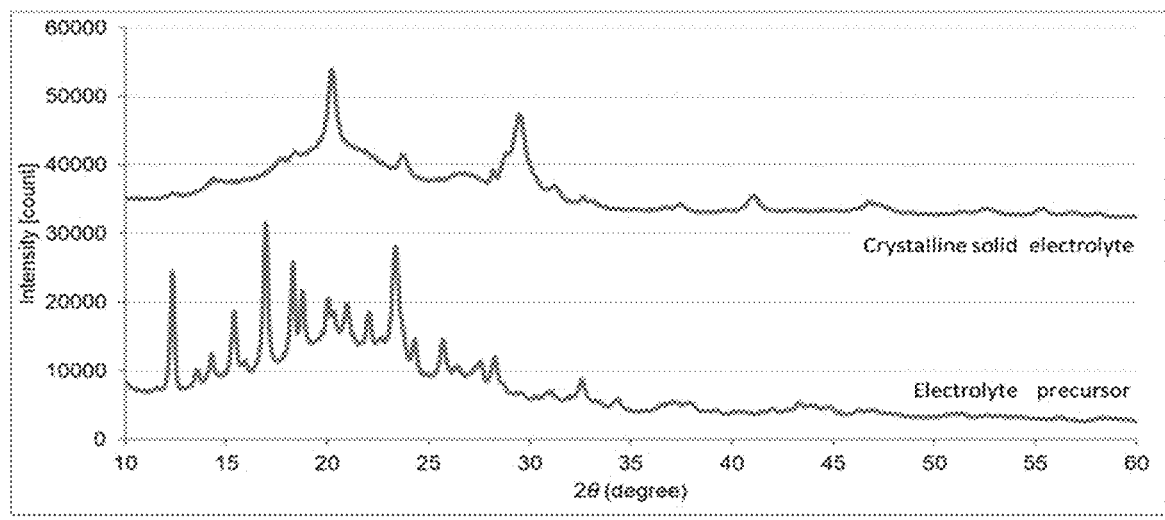
FIG. 10 is an X-ray diffraction spectrum of each of a co-crystal and a crystalline solid electrolyte obtained in Example 16.

The obtained electrolyte precursor and crystalline solid electrolyte were subjected to powder X-ray diffractometry (XRD) with an X-ray diffraction (XRD) apparatus (Smart-Lab apparatus, manufactured Rigaku Corporation), and X-ray diffraction spectra are shown in FIG. 10.

In the X-ray diffraction spectrum of the electrolyte precursor, peaks different from the peaks derived from the used raw materials were observed, and an X-ray diffraction pattern different from those of the amorphous solid electrolyte and the crystalline solid electrolyte was shown.

In the X-ray diffraction spectrum of the crystalline solid electrolyte, crystallization peaks were detected mainly at 2θ=20.2° and 23.6°, and the crystalline solid electrolyte had a thio-LISICON Region II-type crystal structure. An ionic conductivity of the crystalline solid electrolyte was measured and found to be 4.1 (mS/cm), and the crystalline solid electrolyte was confirmed to have a high ionic conductivity. In addition, as a result of measuring the average particle diameter (DO of the obtained crystalline solid electrolyte, it was found to be 1.2 μm. The various conditions, measurement results, and the like in Example 16 are shown in Table 7.

A part of each of the obtained electrolyte precursor and crystalline solid electrolyte was dissolved in methanol, the obtained methanol solution was subjected to gas chromatographic analysis to measure the content of tetramethylethylenediamine. The results are shown in Table 8.

Example 17

An electrolyte precursor and a crystalline electrolyte were obtained in the same manner as in Example 16, except that in Example 16, the time of the pulverization treatment was changed from 15 minutes to 30 minutes, and the pulverization pass number was changed from 14 passes to 28 passes.

In the X-ray diffraction spectrum of the obtained crystalline solid electrolyte, crystallization peaks were detected mainly at 2θ=20.2° and 23.6°, and the crystalline solid electrolyte had a thio-LISICON Region II-type crystal structure. An ionic conductivity of the crystalline solid electrolyte was measured and found to be 3.6 (mS/cm), and the crystalline solid electrolyte was confirmed to have a high ionic conductivity. In addition, as a result of measuring the average particle diameter ($D_{50}$) of the obtained crystalline solid electrolyte, it was found to be 0.87 μm. The various conditions, measurement results, and the like in Example 17 are shown in Table 7.

Example 18

An electrolyte precursor and a crystalline electrolyte were obtained in the same manner as in Example 16, except that in Example 16, the time of the pulverization treatment was changed from 15 minutes to 1 hour, and the pulverization pass number was changed from 14 passes to 55 passes.

In the X-ray diffraction spectrum of the obtained crystalline solid electrolyte, crystallization peaks were detected mainly at 2θ=20.2° and 23.6°, and the crystalline solid electrolyte had a thio-LISICON Region II-type crystal structure. An ionic conductivity of the crystalline solid electrolyte was measured and found to be 3.4 (mS/cm), and the crystalline solid electrolyte was confirmed to have a high ionic conductivity. In addition, as a result of measuring the average particle diameter (DO of the obtained crystalline solid electrolyte, it was found to be 0.19 μm. The various conditions, measurement results, and the like in Example 18 are shown in Table 7.

slurry of a positive electrode mixture. This slurry was heated in vacuo to achieve drying and crystallization in the same manner as in Example 1, thereby obtaining a positive electrode mixture.

TABLE 7

| | Raw material | | | | | Complexing agent and solvent | | Presence or absence of pulverization of precursor | Properties of product | |
|---|---|---|---|---|---|---|---|---|---|---|
| | $Li_2S$ (g) | $P_2S_5$ (g) | $Li_3PS_4$ (g) | LiBr (g) | LiI (g) | agent Kind | Solvent Kind | | Ionic conductivity (mS/cm) | Particle diameter ($D_{50}$) (μm) |
| Example 16 | — | — | 25.5 | 2.8 | 4.3 | TMEDA | DBE | Yes | 4.1 | 1.2 |
| Example 17 | — | — | 25.5 | 2.8 | 4.3 | TMEDA | DBE | Yes | 3.6 | 0.87 |
| Example 18 | — | — | 25.5 | 2.8 | 4.3 | TMEDA | DBE | Yes | 3.4 | 0.19 |

The raw materials, complexing agents, and solvents used in Examples 16 to 18 as shown in Table 7 are as follows.
$Li_2S$: Lithium sulfide
$P_2S_5$: Diphosphorus pentasulfide
$Li_3PS_4$: Amorphous $Li_3PS_4$ obtained in Production Example 1
LiBr: Lithium bromide
LiI: Lithium iodide
TMEDA: Tetramethylethylenediamine (N,N,N',N'-tetramethylethylenediamine)
DBE: Dibutyl ether

TABLE 8

| | Content of complexing agent (% by mass) | Content of solvent (% by mass) |
|---|---|---|
| Electrolyte precursor | 53.0 | 0.3 |
| Crystalline solid electrolyte | 1.1 | Less than 0.1 |

From the results of Examples 16 to 18, it was confirmed that the solid electrolyte having a small particle diameter can be easily produced by adopting the liquid-phase method. In addition, the ionic conductivity was 3.4 (mS/cm) or more, and the obtained solid electrolytes had a high ionic conductivity. In comparison among Examples 16 to 18, by increasing the time or the pulverization pass number of the pulverization treatment, it becomes possible to make the particle diameter smaller, but the ionic conductivity tends to be lowered. In the present invention, by adjusting the time or the pulverization pass number of the pulverization treatment, it is possible to obtain desired particle diameter and ionic conductivity.

Application Example: Example of Positive Electrode Mixture

To an electrolyte precursor inclusion (inclusion liquid) prepared in the same manner as in Example 1, an active material was added such that a ratio of a crystalline solid electrolyte obtained from this electrolyte precursor to the active material was 10/90. As a positive electrode active material, one in which a coating layer of LTO ($Li_4Ti_5O_{12}$) was formed on the surface of $LiNi_{0.8}Co_{0.15}Al_{0.05}O_2$ (average particle diameter ($D_{50}$): 6.2 μm, BET specific surface area: 0.43 m$^2$/g; hereinafter sometimes referred to as "NCA") was used. DBE was further added, to prepare a precursor 60 mg of the crystalline solid electrolyte obtained in Example 1 was charged in a ceramic-made cylinder having a diameter of 10 mm and then pressure-molded to prepare an electrolyte layer.

23.6 mg of the aforementioned positive electrode mixture was charged in an upper part of the electrolyte layer and then pressure-molded to prepare an action electrode. An InLi alloy foil was stuck onto the surface of the electrolyte layer opposite to the action electrode and then pressure-molded to prepare a reference electrode also working as a counter electrode. Subsequently, the periphery of the cell was subjected to screw fastening in four places at intervals of 90°, thereby prepare a half-cell having a three-layered structure. As for the InLi alloy, so long as a raw material ratio (Li/In) is 0.8 or less, a reaction potential of Li deinsertion is kept at a fixed level, and therefore, it can be used as the reference electrode.

Figure 11:
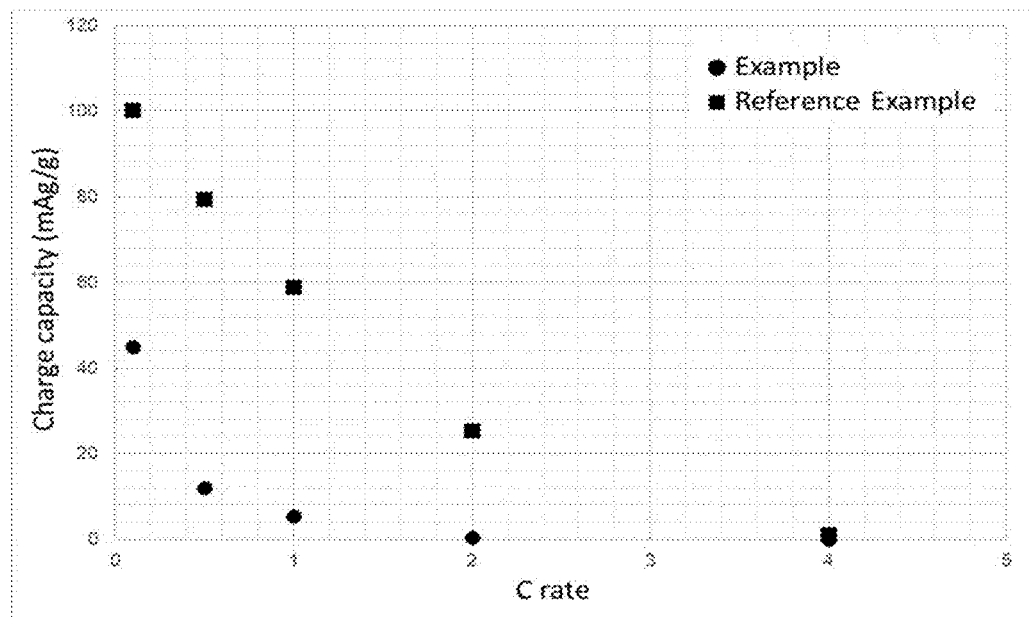
FIG. 11 shows cycle characteristics of a positive electrode mixture shown in Application Examples.

With respect to the obtained half-cell, a cut-off voltage was set 3.6 V at the charge time and 2.5 V at the discharge time, respectively, a current density at the charge and discharge time was fixed at 0.24 mAcm$^{-2}$, and a cycle characteristic evaluation was performed. As a result, the charge capacity at the first cycle time was set to 100 mAh/g; at the second cycle, the current density was fixed at 1.2 mAcm$^{-2}$, and the charge capacity at the second cycle time became 79 mAh/g; at the third cycle, the current density was fixed at 2.4 mAcm$^{-2}$, and the charge capacity at the third cycle time became 59 mAh/g; at the fourth cycle, the current density was fixed at 4.8 mAcm$^{-2}$, and the charge capacity at the fourth cycle time became 25 mAh/g. At the fifth cycle, the current density was fixed at 7.2 mAcm$^{-2}$, and the charge capacity at the fourth cycle time became 8.4 mAh/g. At the sixth cycle, the current density was fixed at 9.6 mAcm$^{-2}$, and the charge capacity at the fourth cycle time became 1.2 mAh/g. The foregoing results are shown in FIG. 11 in which the abscissa is the C rate, and the ordinate is the charge capacity.

Reference Example of Positive Electrode Mixture

Using a tumbling mill ("Small-size Ball Mill AV Type (model number), manufactured by Asahi Rika Factory, Ltd.), 0.1 g of the crystalline solid electrolyte obtained in Reference Example 2 and 0.9 g of the positive electrode active material the same as in the aforementioned Example were mixed at a rotation rate of 600 rpm for 1 hour, to obtain an electrode mixture (positive electrode mixture). Subsequently, a half-cell was prepared in the same manner as in the aforementioned Example.

A cut-off voltage was set 3.6 V at the charge time and 2.5 V at the discharge time, respectively, a current density at the charge and discharge time was fixed at 0.24 mAcm$^{-2}$, and a cycle characteristic evaluation was performed. As a result, the charge capacity at the first cycle time was set to 45.3 mAh/g; at the second cycle, the current density was fixed at 1.2 mAcm$^{-2}$, and the charge capacity at the second cycle time became 12 mAh/g; at the third cycle, the current density was fixed at 2.4 mAcm$^{-2}$, and the charge capacity at the third cycle time became 5.4 mAh/g; and at the fourth cycle, the current density was fixed at 4.8 mAcm$^{-2}$, and the charge capacity at the fourth cycle time became 0.4 mAh/g. At the fifth cycle, the current density was fixed at 9.6 mAcm$^{-2}$, and the charge capacity at the fifth cycle time became 0 mAh/g. The foregoing results are shown in FIG. 11 in which the abscissa is the C rate, and the ordinate is the charge capacity.

INDUSTRIAL APPLICABILITY

In accordance with the production method of a solid electrolyte of the present embodiment, a crystalline solid electrolyte which is high in the ionic conductivity and excellent in the battery performance and is able to suppress the generation of hydrogen sulfide can be produced. The crystalline solid electrolyte obtained by the production method of the present embodiment is suitably used for batteries, especially batteries to be used for information-related instruments, communication instruments, and so on, such as personal computers, video cameras, and mobile phones.

The invention claimed is:

1. A method of producing a solid electrolyte, the method comprising mixing
   a raw material inclusion comprising a lithium element, a sulfur element, a phosphorus element, and a halogen element with
   a complexing agent comprising a compound having at least two tertiary amino groups.

2. The method of claim 1, wherein the compound is an aliphatic amine.

3. The method of claim 2, wherein the aliphatic amine is at least one selected from the group consisting of tetramethylethylenediamine and tetramethyldiaminopropane.

4. The method of claim 1, wherein the raw material inclusion comprises, as raw materials, lithium sulfide and diphosphorus pentasulfide.

5. The method of claim 1, wherein the raw material inclusion comprises, as a raw material, amorphous $Li_3PS_4$ or crystalline $Li_3PS_4$.

6. The method of claim 1, comprising obtaining an electrolyte precursor constituted of the complexing agent, a lithium element, a sulfur element, a phosphorus element, and a halogen element.

7. The method of claim 6, comprising mixing the raw material inclusion, the complexing agent, and a solvent not dissolving the electrolyte precursor.

8. The method of claim 7, wherein the solvent has a solubility parameter of 10 or less.

9. The method of claim 7, wherein the solvent is at least one solvent selected from the group consisting of an aliphatic hydrocarbon solvent, an alicyclic hydrocarbon solvent, an aromatic hydrocarbon solvent, and an ether-based solvent.

10. The method of claim 6, comprising pulverizing the electrolyte precursor.

11. The method of claim 6, comprising heating the electrolyte precursor or an electrolyte precursor pulverized product obtained through pulverizing the electrolyte precursor.

12. The method of claim 1, wherein the solid electrolyte has a thio-LISICON Region II-type crystal structure.

13. The method of claim 12, wherein the solid electrolyte does not have diffraction peaks at $2\theta=17.5°$ and $26.1°$ in X-ray diffractometry using a CuKα ray.

14. An electrolyte precursor, comprising a lithium element, a sulfur element, a phosphorus element, a halogen element, and a complexing agent comprising a compound having at least two tertiary amino groups.

15. The electrolyte precursor of claim 14, wherein a content of the complexing agent is 10% by mass or more and 70% by mass or less.

* * * * *